United States Patent
Dutta

(10) Patent No.: US 11,792,044 B2
(45) Date of Patent: Oct. 17, 2023

(54) OFFSET LABEL FOR AGGREGATING MULTICASTS FROM MULTIPLE VIRTUAL PRIVATE NETWORKS ON A SINGLE MULTICAST DISTRIBUTION TREE

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 229 days.

(21) Appl. No.: 16/733,575

(22) Filed: Jan. 3, 2020

(65) Prior Publication Data
US 2021/0211324 A1   Jul. 8, 2021

(51) Int. Cl.
H04L 12/46 (2006.01)
H04L 12/18 (2006.01)
H04L 45/50 (2022.01)

(52) U.S. Cl.
CPC ........ H04L 12/4675 (2013.01); H04L 12/185 (2013.01); H04L 45/507 (2013.01)

(58) Field of Classification Search
CPC .. H04L 12/4675; H04L 12/185; H04L 45/507
USPC ........................................................ 370/254
See application file for complete search history.

(56) References Cited

U.S. PATENT DOCUMENTS

| | | | |
|---|---|---|---|
| 7,933,267 B1 | 4/2011 | Aggarwal et al. | |
| 7,986,695 B1* | 7/2011 | Kodeboyina | H04L 45/64 380/282 |
| 8,208,404 B1* | 6/2012 | Kothari | H04L 45/02 370/254 |
| 9,686,381 B1* | 6/2017 | Singh | H04L 67/2814 |
| 2005/0125490 A1 | 6/2005 | Ramia | |
| 2008/0084881 A1* | 4/2008 | Dharwadkar | H04L 45/50 370/392 |
| 2008/0205404 A1* | 8/2008 | Wen | H04L 45/02 370/392 |
| 2008/0298360 A1 | 12/2008 | Wijnands et al. | |

(Continued)

OTHER PUBLICATIONS

Adams, A. et al., "Protocol Independent Multicast—Dense Mode (PIM-DM): Protocol Specification (Revised)", RFC 3973, Jan. 2005, 61 pages.

(Continued)

*Primary Examiner* — Faisal Choudhury
(74) *Attorney, Agent, or Firm* — Tong, Rea, Bentley & Kim, LLC

(57) ABSTRACT

An apparatus includes a memory configured to store labels of virtual private networks (VPNs) in a first local label space. The apparatus also includes a processor to assign a first label block identifier (LBI) to a first block of labels in the first local label space and assign a first tuple to a first VPN. The first tuple includes the first LBI and a first label index (LI) that indicates a location of a first label of the first VPN within the first block of labels. The apparatus also includes a transceiver configured to provide the first tuple to routers that allocate second blocks of labels from second local label spaces based on the first tuple. The second routers store the first label at locations in the second label spaces indicated by the first LI.

23 Claims, 22 Drawing Sheets

(56) References Cited

U.S. PATENT DOCUMENTS

| | | | | |
|---|---|---|---|---|
| 2012/0113803 A1* | 5/2012 | Kothari | ............... | H04L 45/507 370/228 |
| 2012/0177054 A1* | 7/2012 | Pati | ................... | H04L 12/4625 370/395.53 |
| 2012/0219004 A1* | 8/2012 | Balus | ................ | H04L 12/4641 370/395.53 |
| 2014/0321472 A1* | 10/2014 | Jiang | ................. | H04L 12/4625 370/408 |

OTHER PUBLICATIONS

Aggarwal, R. et al., "Extensions to Resource Reservation Protocol—Traffic Engineering (RSVP-TE) for Point-to-Multipoint TE Label Switched Paths (LSPs)", RFC 4875, May 2007, 53 pages.

Aggarwal, R. et al., "MPLS Upstream Label Assignment and Context-Specific Label Space", RFC 5331, Aug. 2008, 13 pages.

Fenner, B. et al., "Protocol Independent Multicast—Sparse Mode (PIM-SM): Protocol Specification (Revised)", RFC 7761, Mar. 2016, 137 pages.

Rosen, E. et al., "BGP/MPLS IP Virtual Private Networks (VPNs)", RFC 4364, Feb. 2006, 47 pages.

Rosen, E. et al., "Multicast in MPLS/BGP IP VPNs", RFC 6513, Feb. 2012, 88 pages.

Sajassi, A. et al., "BGP MPLS-Based Ethernet VPN", RFC 7432, Feb. 2015, 56 pages.

Wijnands, IJ. et al., Label Distribution Protocol Extensions for Point-to-Multipoint and Multipoint-to-Multipoint Label Switched Paths, RFC 6388, Nov. 2011, 39 pages.

Wijnands, IJ. et al., "Multicast Using Bit Index Explicit Replication (Bier)", RFC 8279, Nov. 2017, 43 pages.

Anonymous, "Python—Pandas Dataframe Relative Indexing—Stack Overflow," Dec. 26, 2015, downloaded on Apr. 27, 2021 from https://stackoverflow.com/questions/34471672/pandas-dataframe-relative-indexing, pp. 1-3.

Anonymous, "Assembly Language Programming," Jan. 28, 2013, downloaded on Apr. 27, 2021 from http://www.ece.utep.edu/cources/web3376/Notes_files/ee3376-assembly.pdf, pp. 1-53.

European Office Action mailed in corresponding EP 20215136.1 dated May 6, 2021, 9 pages.

EP Examination Report mailed in corresponding EP Application No. 20215136.1 dated Mar. 17, 2023, 7 pages.

* cited by examiner

PE ROUTER 111 ILM TABLE 305

| LABEL | NHLFE | | CONTEXT |
|---|---|---|---|
| | NEXT HOP | NEXT HOP LABEL | |
| L2B | SELF | NONE | VPN 120 |
| L3BA | SELF | NONE | VPN 130, 110 |
| L3BC | SELF | NONE | VPN 130, 112 |
| L3BD | SELF | NONE | VPN 130, 113 |
| LAB_B | SELF | NONE | LSP_AB |
| LCB_B | SELF | NONE | LSP_CB |
| LDB_B | SELF | NONE | LSP_DB |

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              ////                                             ~
+-+-+-+-+-+-+-+-+-+-+-+-+-+-+-+-+-+-+-+-+-+-+-+-+-+-+-+-+-+-+-+-+
|             OLSI                      | Exp |S| TTL/Flags     |
+-+-+-+-+-+-+-+-+-+-+-+-+-+-+-+-+-+-+-+-+-+-+-+-+-+-+-+-+-+-+-+-+
|         LBI (Optional)                | Exp |S|    TTL        |
+-+-+-+-+-+-+-+-+-+-+-+-+-+-+-+-+-+-+-+-+-+-+-+-+-+-+-+-+-+-+-+-+
|              OL                       | Exp |S|    TTL        |
+-+-+-+-+-+-+-+-+-+-+-+-+-+-+-+-+-+-+-+-+-+-+-+-+-+-+-+-+-+-+-+-+
//                    //                                      //
//                    //                                      //
+-+-+-+-+-+-+-+-+-+-+-+-+-+-+-+-+-+-+-+-+-+-+-+-+-+-+-+-+-+-+-+-+
```

FIG. 22

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              ////                                             ~
+-+-+-+-+-+-+-+-+-+-+-+-+-+-+-+-+-+-+-+-+-+-+-+-+-+-+-+-+-+-+-+-+
|             OLSI                      | Exp |S| TTL/Flags     |
+-+-+-+-+-+-+-+-+-+-+-+-+-+-+-+-+-+-+-+-+-+-+-+-+-+-+-+-+-+-+-+-+
|    LBI     |   OL                     | Exp |S|    TTL        |
+-+-+-+-+-+-+-+-+-+-+-+-+-+-+-+-+-+-+-+-+-+-+-+-+-+-+-+-+-+-+-+-+
//                    //                                      //
//                    //                                      //
+-+-+-+-+-+-+-+-+-+-+-+-+-+-+-+-+-+-+-+-+-+-+-+-+-+-+-+-+-+-+-+-+
```

FIG. 23

OFFSET LABEL FOR AGGREGATING MULTICASTS FROM MULTIPLE VIRTUAL PRIVATE NETWORKS ON A SINGLE MULTICAST DISTRIBUTION TREE

BACKGROUND

A virtual private network (VPN) extends a private network across a public network and enables users to maintain privacy of data that is communicated across the public network. In some cases, a private network connection to the VPN supported by the public network is established using an encrypted tunneling protocol to ensure security. In those cases, VPN users use authentication methods, such as passwords or certificates, to gain access to the VPN. A VPN is partitioned into one or more VPN sites at different (logical or physical) locations. Each VPN site is connected, via a customer edge (CE) router that has an access link to a provider edge (PE) router, to a public network that offers the VPN service. The PE routers are interconnected by one or more provider routers within the public network. For example, a first VPN site is connected to the public network via a first set of CE routers and a second VPN site is connected to the public network via a second set of CE routers.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 3 and 4 are block diagrams of mappings between an incoming label map (ILM) table for a PE router, native VPN forwarding tables (NVFTs), and a forwarding equivalence class (FEC)-to-next hop label forwarding entry (NHLFE) (FTN) table according to some embodiments.

FIG. 22 is an example encoding of {OLSI, OLS} in a MPLS packet.

FIG. 23 is another example encoding of {OLSI, OLS} in a MPLS packet.

DETAILED DESCRIPTION

Figure 1:
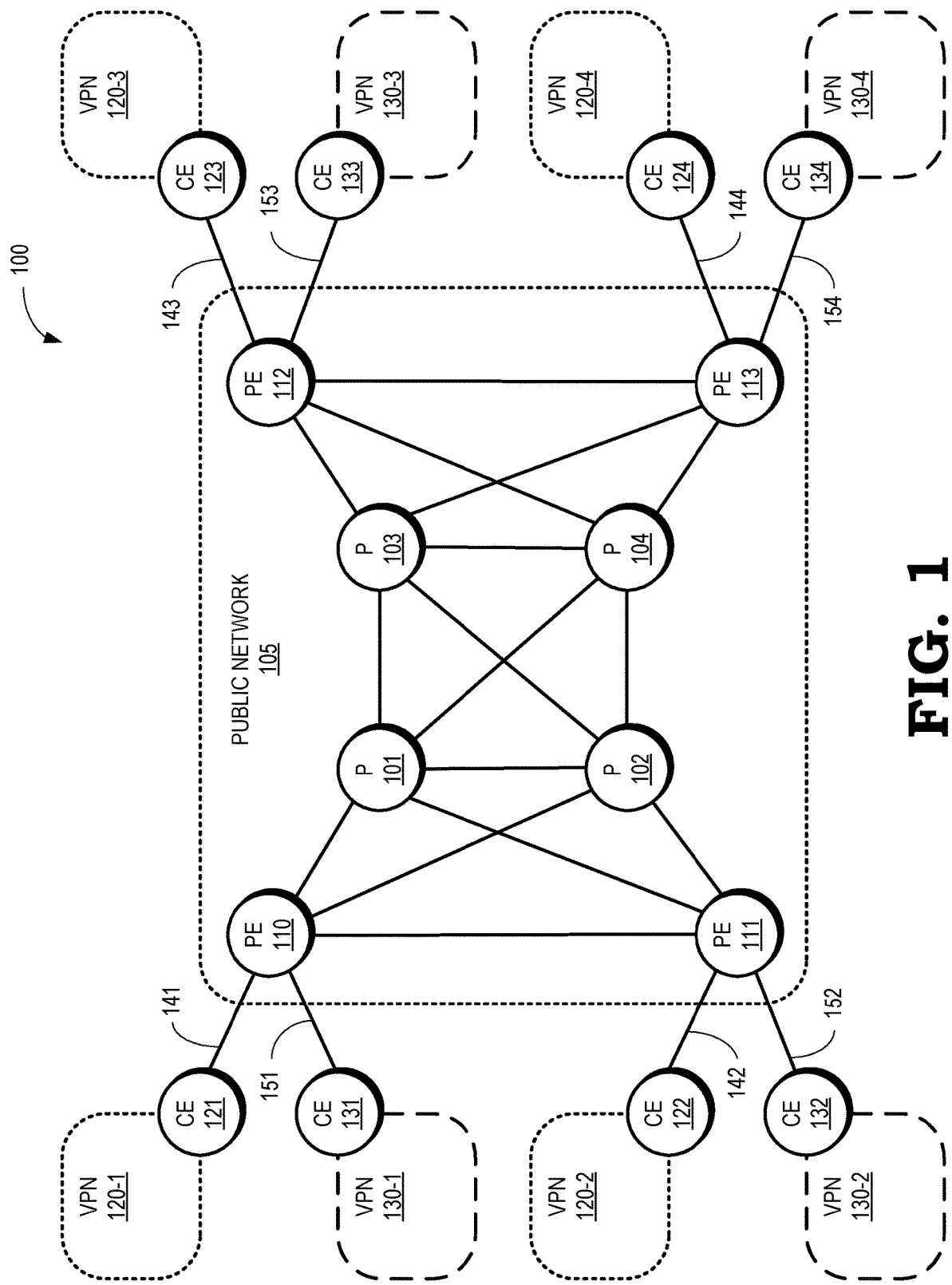
FIG. 1 is a block diagram of a communication system that includes a public network that provides virtual private network (VPN) services for multiple VPNs according to some embodiments.

To establish connectivity for a virtual private network (VPN), a provider edge (PE) router generates a label for the VPN from its local label space and advertises the same VPN label (against a VPN identifier) to remote PE routers. Each PE router is typically both an ingress PE (for VPN labels advertised by remote PE routers) and an egress PE router (for VPN labels that it advertises to the remote PE routers). When acting as an egress router, the PE router programs a first forwarding table (e.g., an incoming label map (ILM) table) that maps its advertised VPN labels to corresponding forwarding rules for the packet in the context of the corresponding VPNs. When acting as an ingress router, the PE router programs the VPN labels advertised by remote PE routers into a second forwarding table, e.g., a forwarding equivalence class (FEC)-to-next hop label forwarding entry (NHLFE) table (FTN), which maps the next hop egress PE routers in a VPN to their advertised VPN labels. For example, an FTN entry maps an identifier of the VPN and an egress PE router to the VPN label advertised by the egress PE router. Each PE router also includes a per-VPN (third) forwarding table that indicates the next hop for an incoming packet based on an identifier of the VPN and the destination address of the packet. Depending on the destination address, the next hop can be a PE router or an access link to a local site of the VPN. Typically, the third forwarding table is built from routing information (for the destinations) advertised for the VPN by the remote PE routers and by the local site(s) of the VPN.

In operation, an ingress PE router receives a packet from an associated VPN site. The ingress PE router identifies the VPN based on the source of the packet, e.g., the access link that carried the packet from the VPN to the ingress PE router. The ingress PE router determines the next hop for the packet, e.g., the egress PE router, based on entries in the third forwarding table. The ingress PE router then determines the VPN label to the egress PE router based on entries in the second forwarding table. The ingress PE router encapsulates the VPN packet with the VPN label to the next-hop PE router and sends the encapsulated packet to the next hop egress PE router, e.g., via a tunnel that is indicated by a tunnel encapsulation of the packet that includes the VPN label. A tunnel is utilized between the ingress and egress PE routers to transport the VPN packet with the VPN label, because the PE routers are not directly connected to each other. The egress PE routers remove the tunnel encapsulation and associates the packet with a VPN based on the received VPN label and the first forwarding table. The egress PE routers then forward the packet to the VPN site based on the lookup in the third forwarding table. The ingress PE router can unicast packets to a single egress PE router or multicast packets to a set of egress PE routers. In one approach to multicasting, the ingress PE router generates one replica of each packet for each egress PE router in the multicast set and the replicated packets are unicast to each egress PE router. However, this approach places the entire replication load on the ingress PE router and consumes extra bandwidth on links that are shared by paths to different egress PE routers. Another approach uses a multicast distribution tree (MDT) that branches when paths to different subsets of the egress PE routers diverge. The ingress PE router transmits a single copy of a packet onto the MDT and the packet is replicated by routers at branch points of the MDT.

An ingress PE router can aggregate multiple VPNs onto a single MDT by pushing a VPN-specific label onto a packet before pushing an MDT encapsulation onto the packet. The egress PE routers de-multiplex the packets based on the VPN-specific label after removing the MDT encapsulation. However, the same VPN-specific label is used by all the egress PE routers so the VPN-specific label cannot be allocated from the local label spaces of the egress PE routers because this would result in different egress PE routers allocating different VPN-specific labels. Instead, the ingress PE router allocates the VPN-specific label to the egress PE routers. The VPN-specific label is referred to as an "upstream assigned label (UAL)," which is stored in a UAL space that is outside of the local label space in the PE routers. The ingress PE router allocates the UAL label from its UAL space for a VPN that shares an MDT and advertises the UAL label to all egress PE routers. The egress PE routers use the advertised UAL label to program upstream forwarding tables, e.g., upstream ILM tables, that map the UAL to the corresponding context or VPN. The egress PE router maintains an upstream forwarding table for each ingress PE router associated with a VPN and an MDT. If the egress PE router receives an MDT encapsulated packet, the egress PE router assumes the next label under the MDT encapsulation is a UAL. The egress PE router determines the VPN for the packet based on the UAL and the upstream forwarding table for the ingress PE router, e.g., the upstream ILM table.

Aggregating multiple VPNs onto a single MDT using UALs forces every PE router to maintain an upstream forwarding table for each remote PE router. The PE routers are therefore required to maintain a significant amount of forwarding state to support the VPNs. For example, if there are N different VPNs that are connected to a network by a set of M different PE routers, then each PE router needs to maintain (M−1) different upstream forwarding tables and each upstream forwarding table contains N entries for the different VPNs. The PE routers therefore require forwarding state that includes N×(M−1) entries in upstream forwarding tables. The number N of VPNs can be 64,000 or more and the number M of PE routers can be fifty or more. In addition, each PE router participating in a VPN allocates a UAL for the VPN and therefore the PE router is required to manage a UAL space in addition to its local label space. Furthermore, although the UAL space is linear with respect to the upstream PE router, the upstream forwarding tables cannot be maintained as an array because the size of the UAL space is unknown to the downstream PE routers. The size of the UAL space could be advertised by the upstream PE router but maintaining the (M−1) different upstream forwarding tables as an array is suboptimal. Instead, the upstream forwarding tables are usually implemented in a compressed form such as a hash table or other key-to-value lookup method that uses the UAL as the key. Implementing the UAL space therefore exacts a high cost in space and complexity.

FIGS. 1-21 disclose embodiments of a provider edge (PE) router that reserves a block of labels in its local label space for allocating virtual private network (VPN) labels. The label block in the PE router is assigned a label block identifier (LBI) that is unique within the network that includes the PE router. The number of contiguous labels in (e.g., the size of) the label block is determined statically based on a maximum number of VPNs that are supported by the PE router or dynamically by allocating additional blocks in response to previously allocated blocks being consumed as VPNs are provisioned. The PE router maps the label block into any arbitrary range of contiguous labels in its local label space. Thus, different PE routers in the network can map the label block into different ranges of contiguous labels in their different local label spaces. A label index indicates the location of a label within the label block, e.g., relative to the LBI for the label block. A VPN associated with the PE router is assigned a tuple (sometimes referred to herein as an offset label stack, OLS) that indicates the LBI and the label index for the VPN. The tuple is unique within the network so that each PE router in the network associates the tuple with the same VPN. The PE routers in the network then allocate VPN labels from their local label spaces based on the tuple and the VPN labels are programmed into a local (first) forwarding table (e.g., an incoming label map (ILM) table) that maps the VPN labels to corresponding forwarding rules for received VPN packets. Thus, instead of exchanging a VPN label such as an upstream assigned label (UAL), the PE routers exchange the tuple associated with the VPN. The PE router that receives the tuple encoded in a received packet, converts the tuple to a VPN label that is used to identify the destination VPN and forward the packet based on the local forwarding table. The VPN label remains private to the PE router. Thus, a single downstream assigned VPN label is used to receive unicast and multicast packets for a VPN and no UAL is necessary.

FIG. 1 is a block diagram of a communication system 100 that includes a public network 105 that provides VPN services for multiple VPNs according to some embodiments. The public network 105 includes transit or provider (P) routers 101, 102, 103, 104 (collectively referred to herein as "the routers 101-104") that route packets through the public network 105 based on information included in the packets and forwarding tables stored in the P routers 101-104. The public network 105 also includes PE routers 110, 111, 112, 113, which are collectively referred to herein as "the PE routers 110-113." The PE routers 110-113 are gateways that provide access to services offered by the public network 105, such as VPN services.

In the illustrated embodiment, the public network 105 offers connectivity between remote sites of two VPNs 120, 130. The VPN 120 includes a remote site 120-1 that is connected to the PE router 110 in the public network 105 by a customer edge (CE) router 121 via an access link 141, a remote site 120-2 that is connected to the PE router 111 by a CE router 122 via an access link 142, a remote site 120-3 that is connected to the PE router 112 by a CE router 123 via an access link 143, and a remote site 120-4 that is connected to the PE router 113 by a CE router 124 via an access link 144. The VPN 130 includes a remote site 130-1 that is connected to the PE router 110 in the public network 105 by a CE router 131 via an access link 151, a remote site 130-2 that is connected to the PE router 111 by a CE router 132 via an access link 152, a remote site 130-3 that is connected to the PE router 112 by a CE router 133 via an access link 153, and a remote site 130-4 that is connected to the PE router 113 by a CE router 134 via an access link 154. The PE routers 110-113 identify the VPNs 120, 130 that provided packets based on the access links 141-144, 151-154 that conveyed the packets to the PE routers 110-113.

Within the public network 105, only the PE routers 110-113 maintain VPN-specific forwarding states. Some embodiments of the PE routers 110-113 maintain private forwarding tables for each VPN associated with the PE router, e.g., the previously mentioned third forwarding tables. The private forwarding tables are sometimes referred to as "native VPN forwarding tables" in the following discussion. The native VPN forwarding tables in the PE routers 110-113 contain the forwarding rules for the "native" packet type of the VPN. For example, the native packet type is an IP packet in an IP-VPN, the native packet type is an Ethernet packet for an Ethernet based VPN, etc. When the PE routers 110-113 are operating as ingress routers, the forwarding rules in the native VPN forwarding tables are used to match and forward native packets received from a local VPN site via the access links 141-144, 151-154 to one or more remote PE routers 110-113. When the PE routers 110-113 are operating as egress routers, the forwarding rules in the native VPN forwarding tables are used to match and forward native packets received from a remote PE router 110-113 to local VPN sites via the access links 141-144, 151-154.

Table 1 is an example of a native VPN forwarding table at a PE router for an IP-VPN. In the terminology of IP-VPN, Table 1 is referred to as a Virtual Route Forwarder (VRF) for a VPN indicated by the value z.

TABLE 1

| VRF for VPN z | |
|---|---|
| IP Prefix | Next-hop |
| ... | ... |
| 10.10.10.0/24 | PE x |
| ... | ... |
| 116.11.0.0/16 | Access link y |
| ... | ... |

The PE router accesses the native VPN forwarding table (e.g., Table 1) in response to receiving an IPv4 packet for the VPN z from an access link. The IPv4 packet includes a destination address, e.g., the destination IP address of the packet is 10.10.10.5. The PE router looks up the destination IP address in the native VPN forwarding table based on longest-prefix-match (LPM) to make a forwarding decision. In this case, the lookup matches the prefix 10.10.10.0/24, which is in remote PE x. The PE router therefore sends the IPv4 packet to remote PE x. Similarly, if the PE router receives an IPv4 packet for VPN z from a remote PE router and the destination address in the packet as 116.11.12.1, the PE router looks up a corresponding entry in the native VPN forwarding table, 116.11.0.0/16, which results in the PE router forwarding the packet to the locally connected site of VPN z via access link y.

For packets transmitted within the public network 105, VPN specific forwarding takes place only from an ingress PE router to an egress PE router (in case of unicast packets) or to a set of egress PE routers (in case of multicast packets). For example, the PE router 110 acts as an ingress PE router to forward VPN packets to the PE router 112, which acts as an egress PE router. However, the PE routers 110-113 cannot send a VPN packet to another PE router as the native packet type because the PE routers 110-113 are connected across a public network. Instead, pairs of PE routers 110-113 in the VPN 120, 130 negotiate among themselves to form a connection for the VPN 120, 140 over the public network 105, which includes the routers 101-104. The native VPN packets are then exchanged over the connection by encapsulating the native packets with an encapsulation that identifies the VPN connection. In the illustrated embodiment, the VPNs 120, 130 are MPLS-based VPNs and VPN connections are established by exchanging MPLS labels between the PE routers 110-113. The MPLS labels function as VPN connection identifiers.

The PE routers 110-113 reserve a portion of a memory for a local label space that stores labels associated with the VPNs 120, 130. To establish connectivity for a VPN, a PE router allocates an MPLS label from its local label space (also referred to as a "per-platform label space") and advertises the label against the VPN Identifier (VPN-ID) to all PE routers 110-113 that are connected to a remote site of the VPN. A VPN-ID uniquely identifies a VPN in the public network 105. The MPLS label allocated for a VPN is referred to as a "VPN-Label." To send a packet to an egress PE router, ingress PE router encapsulates a packet for the VPN with a VPN-Label advertised by the egress PE router. On receipt of the packet, the egress PE router uniquely associates the packet with its VPN based on the received VPN-Label. In some cases, some of the PE routers of a VPN do not have a direct signaling sessions to each other. For example, in some embodiments of border gateway protocol (BGP) signaled VPNs, the PE routers 110-113 do not have signaling sessions to a common BGP Route Reflector (BGP-RR) through which the VPN advertisements are exchanged among the PE routers 110-113. For another example, PE routers that support inter-AS BGP VPNs can span across multiple Autonomous Systems (ASes).

Some embodiments of the VPNs 120, 130 are layer-3 VPNs such as IP VPN and the PE routers 110-113 provide a virtual router within each VPN 120, 130. The PE routers 110-113 learn the IP routes within a locally connected VPN site by running a dynamic routing protocol with the CE router 121-124, 131-134 or through static configuration of IP routes at the PE routers 110-113. The learned routes are advertised by BGP in the context of the VPN-ID (also referred to as a Route Distinguisher in BGP terminology) to all remote PE routers 110-113 and the VPN-Label is exchanged along with the route advertisements. In case of IP VPN, the VPN forwarding tables at the PE routers 110-113 are Virtual Route Forwarding (VRF) Tables. The routes (prefixes) learned in the VPN from remote PE routers 110-113 and the routes learned from locally connected sites are installed in the VRF of the VPN 120, 130. In operation, an ingress PE router receives an IP packet from a CE router in a VPN, looks up the destination IP address of the packet in corresponding VRF to retrieve the next-hop egress PE router and sends the packet to the egress PE router with the VPN-Label advertised by the egress PE router. Upon receipt of an IP packet with a VPN-Label, an egress PE router identifies the VPN based on the VPN-Label, looks up the destination IP address of the packet in corresponding VRF to make further a forwarding decision.

Some embodiments of the VPNs 120, 130 are Layer-2 VPNs such as BGP signaled multi-protocol label switching (MPLS) based Ethernet VPN (EVPN) and the PE routers 110-113 act as Ethernet switches for the VPN sites. The PE routers 110-113 learn the media access control (MAC) addresses within a locally connected VPN site using MAC learning actions on the access links 141-144, 151-154. The learned MAC addresses are advertised by BGP in the context of the VPN-ID (Route Distinguisher) to all remote PE routers 110-113 and the VPN-Label is exchanged along with the MAC address advertisements. In case of EVPN, the VPN forwarding table at the PE routers 110-113 are MAC forwarding tables. In operation, an ingress PE router receives an Ethernet packet from a CE router in a VPN, looks up the destination MAC address of the Ethernet packet in corresponding MAC forwarding table to retrieve the egress PE router that had advertised the MAC address. The ingress PE router then sends the packet to the egress PE router with the VPN-Label advertised by the egress PE router. Upon receipt of an Ethernet packet with a VPN-Label, the egress PE router forwards the packet by looking up the destination MAC address of the packet in the MAC forwarding table.

In the illustrated embodiment, the PE routers 110-113 are not directly connected with each other, so the PE routers 110-113 tunnel the packets encapsulated by a VPN-Label between the PE routers 110-113 across the public network 105 using tunneling protocols such as MPLS based LSPs (Labelled Switched Paths), IP based tunneling methods such as GRE (Generic Routing Encapsulation), VXLAN (Virtual Extensible Local Area Network), MPLS over user datagram protocol (MPLSoUDP), and the like. The tunnels are sometimes referred as Packet Switched Network (PSN) tunnels. In the illustrated embodiment, the tunnels are implemented using MPLS LSPs as PSN Tunnels. The MPLS LSPs are established by LDP (Label Distribution Protocol), RSVP-TE (Resource Reservation Protocol-Traffic Engineering) or the tunnels are source routed stateless LSPs such as SR (Segment Routing), SR-TE (Segment Routing-Traffic Engineering), and the like. Packets from multiple VPNs can be multiplexed and sent on the same PSN tunnel between the PE routers 110-113 since the VPN-Label acts as a demultiplexer to distinguish packets for the VPNs.

In the illustrated embodiment, multiple VPNs 120, 130 span the same set of PE routers 110-113. However, in other embodiments, the VPNs 120, 130 only a subset of the PE routers 110-113 in common. Furthermore, embodiments of the PE routers 110-113 allocate a single VPN Label and advertise the label to all remote/ingress PE routers.

The PE routers 110-113 distribute VPN labels for the VPN 120, 130 to support forwarding of VPN packets from one site to another site of the VPNs 120, 130. In the following, the PE routers 110-113 are labeled with the letters A-D, respectively, and the VPN labels are denoted by mnemonic "L<middle digit of VPN number><label of advertising PE router>". For example, the VPN label advertised by the PE router 110 for the VPN 120 is L2A and the VPN label advertised by the PE router 111 for the VPN 130 is L3B. For another example, the VPN label advertised by the router 112 for the VPN 120 is L2C and the VPN label advertised by the router 113 for the VPN 130 is L3D. The PE routers 110-113 distribute VPN labels as follows:

PE 110(A)
  VPN 120:
    To PE 111(B)=L2A
    To PE 112(C)=L2A
    To PE 113(D)=L2A
  VPN 130:
    To PE 111(B)=L3A
    To PE 112(C)=L3A
    To PE 113(D)=L3A
PE 111(B)
  VPN 120:
    To PE 110(A)=L2B
    To PE 112(C)=L2B
    To PE 113(D)=L2B
  VPN 130:
    To PE 110(A)=L3B
    To PE 112(C)=L3B
    To PE 113(D)=L3B
PE 112(C)
  VPN 120:
    To PE 110(A)=L2C
    To PE 111(B)=L2C
    To PE 113(D)=L2C
  VPN 130:
    To PE 110(A)=L3C
    To PE 111(B)=L3C
    To PE 113(D)=L3C
PE 113(D)
  VPN 120:
    To PE 110(A)=L2D
    To PE 111(B)=L2D
    To PE 112(C)=L2D
  VPN 130:
    To PE 110(A)=L3D
    To PE 111(B)=L3D
    To PE 112(C)=L3D

In the illustrated embodiment, there is at least one MPLS LSP between each of the PE routers 110-113. The LSPs are denoted by a mnemonic LSP_<source router><destination router>. The label advertised by each downstream router for the LSP is denoted by mnemonic L<source router><destination router>_<advertising/downstream router>.

Source Router: PE 110(A)
  Destination Router: PE 111(B)
    LSP_AB=LSP along path 110→102→111. The label advertised by 102 to 110 is LAB_F. Label advertised by 111 to 102 is LAB_B.
  Destination Router: PE 112(C)
    LSP_AC=LSP along path 110→101→103→112. The label advertised by 101 to 110 is LAC_E, label advertised by 103 to 101 is LAC_G, label advertised by 112 to 103 is LAC_C.

Destination Router: PE 113(D)
  LSP_AD=LSP along path 110→102→103→113. The label advertised by 102 to 110 is LAD_F, label advertised by 103 to 102 is LAD_G, label advertised by 113 to 103 is LAD_D.
Source Router: PE 111(B)
  Destination Router: PE 110(A)
    LSP_BA=LSP along path 111→101→110. The label advertised by 101 to 111 is LBA_E. Label advertised by 110 to 101 is LBA_A.
  Destination Router: PE 112(C)
    LSP_BC=LSP along path 111→101→103→112. The label advertised by 101 to 111 is LBC_E, label advertised by 103 to 101 is LBC_G, label advertised by 112 to 103 is LBC_C.
  Destination Router: PE 113(D)
    LSP_BD=LSP along path 110→101→103→113. The label advertised by 101 to 110 is LBD_E, label advertised by 103 to 101 is LBD_G, label advertised by 113 to 103 is LBD_D.
Source Router: PE 112(C)
  Destination Router: PE 110(A)
    LSP_CA=LSP along path 112→104→102→110. The label advertised by 104 to 112 is LCA_H, label advertised by 102 to 104 is LCA_F, label advertised by 110 to 102 is LCA_A.
  Destination Router: PE 111(B)
    LSP_CB=LSP along path 112→104→102→111. The label advertised by 104 to 112 is LCB_H, label advertised by 102 to 104 is LAC_F, label advertised by 111 to 102 is LAC_B.
  Destination Router: PE 113(D)
    LSP_CD=LSP along path 112→103→104→113. The label advertised by 103 to 112 is LCD_G, label advertised by 104 to 103 is LCD_H, label advertised by 113 to 104 is LCD_D.
Source Router: PE 113(D)
  Destination Router: PE 110(A)
    LSP_DA=LSP along path 113→104→101→110. The label advertised by 104 to 113 is LDA_H, label advertised by 101 to 104 is LDA_E, label advertised by 110 to 101 is LDA_A.
  Destination Router: PE 111(B)
    LSP_DB=LSP along path 113→104→102→111. The label advertised by 104 to 113 is LDB_H, label advertised by 102 to 104 is LDB_F, label advertised by 111 to 102 is LDB_B.
  Destination Router: PE 112(C)
    LSP_DC=LSP along path 113→103→112. The label advertised by 103 to 113 is LDC_G, label advertised by 112 to 103 is LDC_C.

An egress PE router (e.g., one of the PE routers 110-113) programs its advertised the VPN-Labels into a corresponding Incoming Label Map (ILM) Table. An ILM Table is the forwarding table in a MPLS router, e.g., the previously mentioned first forwarding table, which is indexed by the labels advertised by the router from its local label space. Each ILM entry maps to the Next-Hop Label Forwarding Entry (NHLFE) that contains forwarding rules for packets received with the corresponding label—such as (a) If packet needs to be forwarded as MPLS packet then the label(s) to be pushed into the packet for its next-hop (b) If this is egress router (self) then the context of the packet etc. contains a pointer to forwarding rules for the packet based on its "native" header of the packet. Examples of the ILM entries at each PE router 110-113 are described below. The ILM entries at a PE router 110-113 also include the entries for the MPLS LSPs terminating at the PE router 110-113 since the ILM Table is common for all labelled packets. Note that the P routers 101-104 also program the labels advertised by it for the MPLS LSPs traversing through it, but examples of the ILMs in P routers 101-104 are not disclosed herein in the interest of clarity.

An ingress PE router (e.g., one of the PE routers 110-113 operating as an ingress router) programs the VPN-Labels advertised by an egress PE router (e.g., one of the PE routers 110-113 operating as an egress router) into an FTN (FEC-To-NHLFE Table), e.g., the previously mentioned second forwarding table. In MPLS, a FEC (Forwarding Equivalence Class) is an identifier assigned to a traffic flow that is identified by a label. One example of a type of FEC is {VPN-ID, Egress PE Router} which is used for VPNs. Another example of an FEC is an LSP identifier which is used for LSP tunnels. Each FEC maps to an NHLFE that contains the label(s) to be pushed into the packet for a next-hop. In the case of a VPN specific FEC, the next-hop in NHLFE is an egress PE router and the label is the VPN-Label advertised by the egress PE router. Examples of VPN specific FTN entries at each PE router 110-113 are described below. Note that each PE router 110-113 also has an FTN Table for the LSPs, although examples of these FTN tables are not disclosed herein in the interest of clarity. In some embodiments, each ingress PE router 110-113 also operates as an egress PE router 110-113 for corresponding VPNs 120, 130.

Tables 2-9 illustrate FTN Tables and ILM Tables for the PE routers 110-113.

TABLE 2

PE Router 110: FTN Table

| | NHLFE | |
|---|---|---|
| FEC | Next-Hop | Label |
| ... | ... | ... |
| VPN 120, 111 | 111 | L2B |
| VPN 120, 112 | 112 | L2C |
| VPN 120, 113 | 113 | L2D |
| ... | ... | ... |
| VPN 130, 111 | 111 | L3B |
| VPN 130, 112 | 112 | L3C |
| VPN 130, 113 | 113 | L3D |
| ... | ... | ... |

TABLE 3

PE Router 110: ILM Table

| | NHLFE | | |
|---|---|---|---|
| Label | Next-Hop | Next-Hop Label | Context |
| ... | ... | ... | ... |
| L2A | Self | None | VPN 120 |
| ... | ... | ... | ... |
| L3A | Self | None | VPN 130 |
| ... | ... | ... | ... |
| LBA_A | Self | None | LSP_BA |
| ... | ... | ... | ... |
| LCA_A | Self | None | LSP_CA |
| ... | ... | ... | ... |
| LDA_A | Self | None | LSP_DA |

TABLE 4

PE Router 111: FTN Table

| FEC | Next-Hop | NHLFE Label |
|---|---|---|
| ... | ... | ... |
| VPN 120, 110 | 110 | L2A |
| VPN 120, 112 | 112 | L2C |
| VPN 120, 113 | 113 | L2D |
| ... | ... | ... |
| VPN 130, 110 | 110 | L3A |
| VPN 130, 112 | 112 | L3C |
| VPN 130, 113 | 113 | L3D |
| ... | ... | ... |

TABLE 5

PE Router 111: ILM Table

| Label | Next-Hop | NHLFE Next-Hop Label | Context |
|---|---|---|---|
| ... | ... | ... | ... |
| L2B | Self | None | VPN 120 |
| ... | ... | ... | ... |
| L3B | Self | None | VPN 130 |
| ... | ... | ... | ... |
| LAB_B | Self | None | LSP_AB |
| ... | ... | ... | ... |
| LCB_B | Self | None | LSP_CB |
| ... | ... | ... | ... |
| LDB_B | Self | None | LSP_DB |

TABLE 6

PE Router 112: FTN Table

| FEC | Next-Hop | NHLFE Label |
|---|---|---|
| ... | ... | ... |
| VPN 120, 110 | 110 | L2A |
| VPN 120, 111 | 111 | L2B |
| VPN 120, 113 | 113 | L2D |
| ... | ... | ... |
| VPN 130, 110 | 110 | L3A |
| VPN 130, 111 | 111 | L3B |
| VPN 130, 113 | 113 | L3D |
| ... | ... | ... |

TABLE 7

PE Router 112: ILM Table

| Label | Next-Hop | NHLFE Next-Hop Label | Context |
|---|---|---|---|
| ... | ... | ... | ... |
| L2C | Self | None | VPN 120 |
| ... | ... | ... | ... |
| L3C | Self | None | VPN 130 |
| ... | ... | ... | ... |
| LAC_C | Self | None | LSP_AC |
| ... | ... | ... | ... |
| LBC_C | Self | None | LSP_BC |

TABLE 7-continued

PE Router 112: ILM Table

| Label | Next-Hop | NHLFE Next-Hop Label | Context |
|---|---|---|---|
| ... | ... | ... | ... |
| LDC_C | Self | None | LSP_DC |

TABLE 8

PE Router 113: FTN Table

| FEC | Next-Hop | NHLFE Label |
|---|---|---|
| ... | ... | ... |
| VPN 120, 110 | 110 | L2A |
| VPN 120, 111 | 111 | L2B |
| VPN 120, 112 | 112 | L2C |
| ... | ... | ... |
| VPN 130, 110 | 110 | L3A |
| VPN 130, 111 | 111 | L3B |
| VPN 130, 112 | 112 | L3C |
| ... | ... | ... |

TABLE 9

PE Router 113: ILM Table

| Label | Next-Hop | NHLFE Next-Hop Label | Context |
|---|---|---|---|
| ... | ... | ... | ... |
| L2D | Self | None | VPN 120 |
| ... | ... | ... | ... |
| L3D | Self | None | VPN 130 |
| ... | ... | ... | ... |
| LAD_D | Self | None | LSP_AD |
| ... | ... | ... | ... |
| LBD_D | Self | None | LSP_BD |
| ... | ... | ... | ... |
| LCD_D | Self | None | LSP_CD |

Thus, the PE routers 110-113 maintain VPN specific forwarding states in the corresponding Native VPN Forwarding Tables (NVFT) for each VPN 120, 130, entries for the VPNs 120, 130 in corresponding FTN Tables (e.g., as illustrated in Tables 2, 4, 6, 8) that are used to retrieve the VPN-Labels to send packets to remote PE routers when operating as an ingress PE router, and entries for the VPN-Labels in ILM Tables (e.g., as illustrated in Tables 3, 5, 7, 9) that are used to receive and process VPN-Labeled packets from remote PE routers when operating as an egress PE router.

Figure 2:
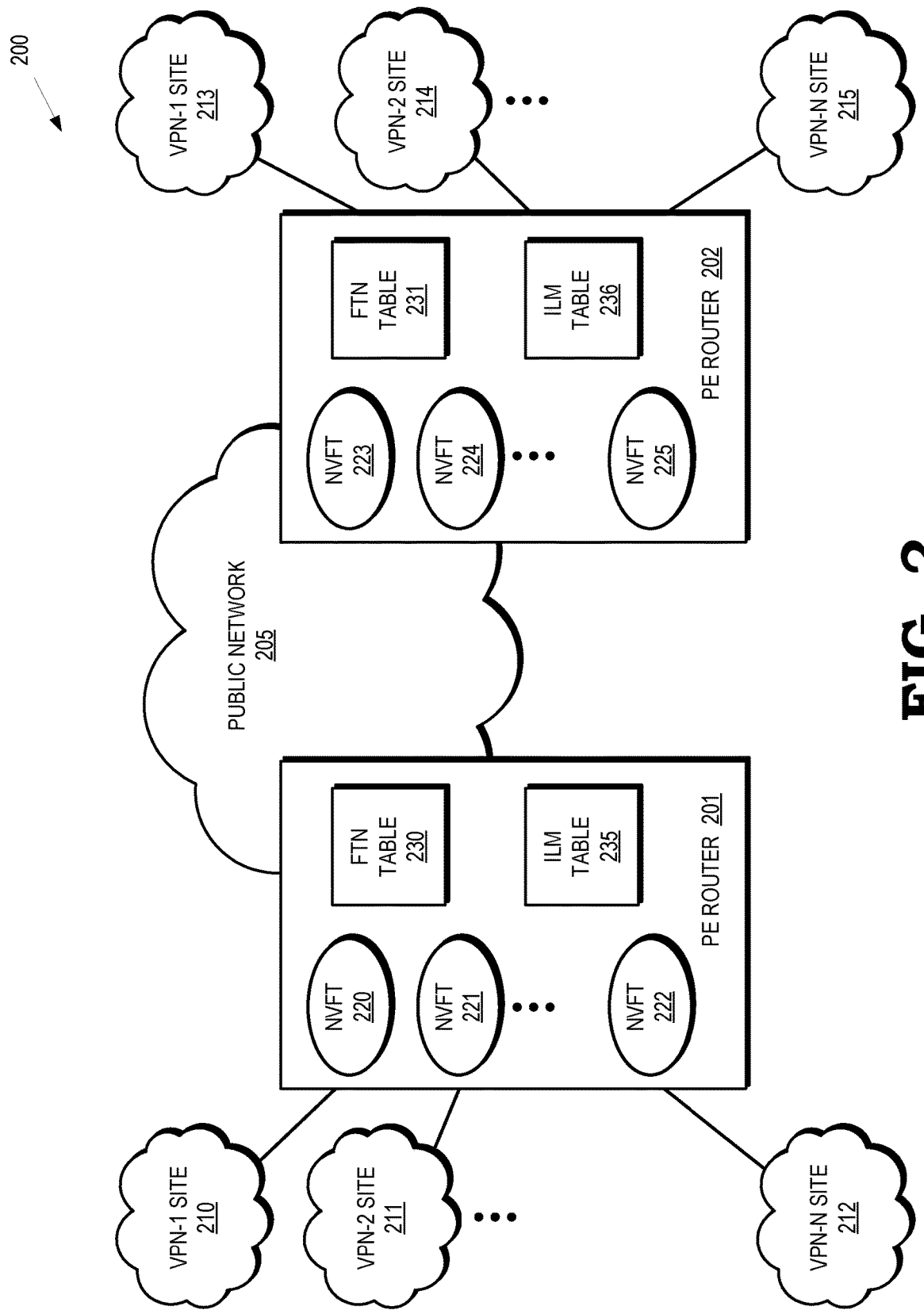
FIG. 2 is a block diagram of a communication system that supports aggregating multicasts from multiple VPNs via provider edge (PE) routers that provide VPN connectivity via a public network according to some embodiments.

FIG. 2 is a block diagram of a communication system 200 that supports aggregating multicasts from multiple VPNs via PE routers 201, 202 that provide VPN connectivity via a public network 205 according to some embodiments. The communication system 200 is used to implement some embodiments of the communication system 100 shown in FIG. 1. In the illustrated embodiment, the PE routers 201, 202 provide VPN services to support connectivity between N VPNs that are deployed at a corresponding set of VPN sites 210, 211, 212, 213, 214, 215 which are collectively referred to herein as "the VPN sites 210-215." For example, the PE routers 201, 202 provide connectivity for the VPN-1 between the VPN-1 cites 210, 213. Although the same set of VPNs are connected to both the routers 201, 202, some embodiments allow different sets or subsets of the VPNs, as well as more or fewer sites associated with the different VPNs, to be connected to the routers 201, 202.

The PE routers 201, 202 host NVFT 220, 221, 222, 223, 224, 225, which are collectively referred to herein as "the NVFT 220-225" and are associated with corresponding VPN sites 210-215. In the illustrated embodiment, the VPN-1 site 210 is associated with the NVFT 220 in the PE router 201, the VPN-1 site 213 is associated with the NVFT 223 in the PE router 202, the VPN-2 site 211 is associated with the NVFT 221 in the PE router 201, the VPN-2 site 214 is associated with the NVFT 224 in the PE router 202, the VPN-N site 212 is associated with the NVFT 222 in the PE router 201, and the VPN-N site 215 is associated with the NVFT 225 in the PE router 202. The PE routers 201, 202 also host corresponding FTN tables 230, 231 and ILM tables 235, 236.

The PE routers 201, 202 advertise VPN-labels for their associated VPNs and the advertised VPN-Labels are used to program the FTN tables 230, 231 and the ILM tables 235, 236. The VPN-Labels advertised by a PE router 201, 202 are programmed into its ILM Table 235, 236. The entries in the ILM tables 235, 236 map the VPN-Label→VPN Context (e.g., a pointer to the NVFT 220-225 for the VPN indicated by the VPN-Label). The VPN-Labels advertised from remote PE routers 201, 202 are programmed into the FTN tables 230, 231. The FTN entries are indexed with {VPN-ID, Egress PE Router} and contain the VPN-Label advertised by the egress PE router 201, 202.

The PE routers 201, 202 exchange messages between entities in the site for the different VPNs by encapsulating the messages in VPN-Labels for each VPN. For example, if an entity in the VPN-1 site 210 wants to transmit a packet to an entity in the VPN-1 site 213, the VPN-1 site 210 sends a native packet to the PE router 201. The PE router 201 looks up the packet in the NVFT 220 to make a forwarding decision and the result is to forward the packet to the PE router 202. The PE router 201 then looks up the entry {VPN-1, PE-B} in the FTN table 230 to get the VPN-Label to the PE router 202. The PE router 201 pushes the VPN-Label onto the packet. The PE router 201 also pushes a tunnel encapsulation onto the packet to tunnel the packet across the public network 205 to the PE router 202. In response to receiving the tunnel encapsulated packet from the PE router 201, the PE router 202 uses the tunnel encapsulation to identify that the tunnel terminates in the PE router 202. The PE router 202 then removes the tunnel encapsulation from the packet and locates the VPN-Label in the packet. The PE router 202 looks up the VPN label in its ILM table 236 and uses the information in the entry indexed by the VPN label to map the packet to VPN 1. The PE router 202 then pops the VPN-Label and to generate the native packet. Further forwarding decisions for the native packet are made by the PE router 202 by looking up matching entries in the NVFT 223. The decision from NVFT 223 is to forward the packet to the VPN-1 site 213 and the PE router 202 sends the packet to the VPN-1 site 213.

Figure 4:
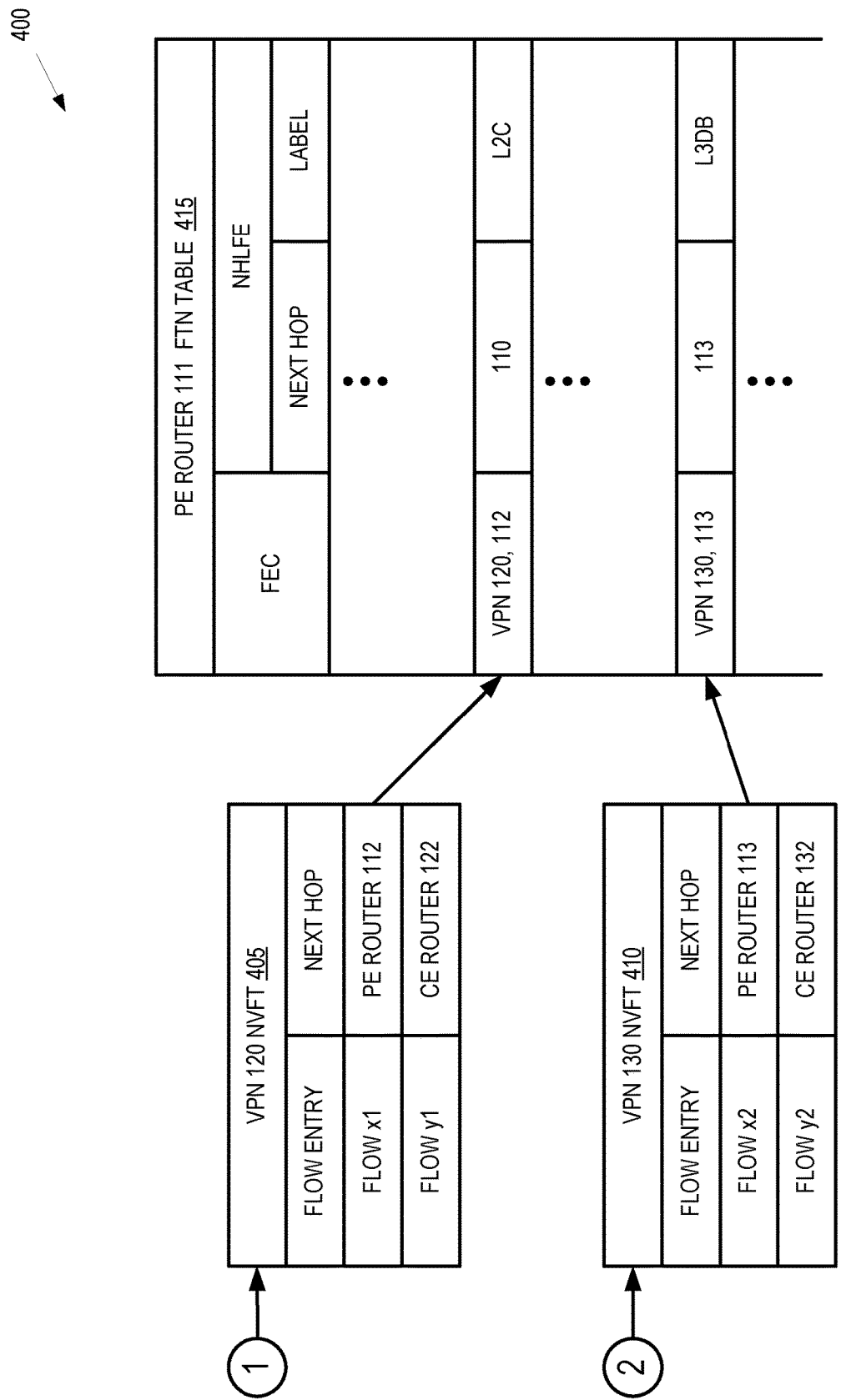

FIGS. 3 and 4 are block diagrams of mappings 300, 400 in a PE router between an incoming label map (ILM) table 305, native VPN forwarding tables (NVFTs) 405, 410, and a forwarding equivalence class (FEC)-to-next hop label forwarding entry (NHLFE) table (FTN) 415 according to some embodiments. The ILM table 305, the NVFTs 405, 410, and the FTN table 415 are used to implement some embodiments of the ILM tables 235, 236, the NVFT 220-225, and the FTN tables 230, 231 shown in FIG. 2.

In the illustrated embodiment, the ILM table 305, the NVFTs 405, 410, and the FTN table 415 represent the corresponding tables implemented in the PE router 111 shown in FIG. 1. When the PE router 111 operates as an egress router, VPN specific entries in the ILM table 300 are linked to the corresponding NVFT 405, 410, as indicated by the arrows and the nodes 1 and 2 shown in FIGS. 3 and 4. When the PE router 111 operates as an ingress router, flows or forwarding rules in the NVFT 405, 410 are links to VPN specific entries in the FTN table 415, as indicated by the arrows in FIG. 4. The flow x1 in the NVFT 405 for VPN 120 is programmed with next-hop as PE router 112. If the PE router 111 receives a native packet from CE router 122 for the VPN 120 and the native packet matches the flow x1, then the native packet is to be sent to PE router 112. In response, the PE router 111 looks up the entry {VPN 120, 112} in FTN Table 415 to retrieve the VPN-Label L2C to be pushed onto the packet. If PE router 111 receives a labelled packet with label L2B then the entry in the ILM table 300 for the label indicates the context as VPN 120. In response to receiving the labelled packet, the PE router 111 pops the label L2B and then looks up the native packet in NVFT 405 for VPN 120. If the native packet matches the flow y1 then the packet is forwarded to CE router 122. Similar lookups are used to route packets received by other PE routers 110-113 in FIG. 1.

In some embodiments, packets are unicast between the VPN sites 120, 130 in the communication system 100 shown in FIG. 1. For example, if the CE router 122 forwards a packet "P1" to PE router 111 via access link 142, the PE router 111 associates the packet P1 with the VPN 120 because the access link 142 is assigned to the VPN 120. The PE router 111 accesses entries in a forwarding table for the VPN 120 (e.g., an NVFT such as the NVFT 405) to make a forwarding decision for the packet P1 based on a destination address indicated in the packet P1. Based on the lookup, the PE router 111 decides to unicast packet P1 to the PE router 112, which is the next-hop for the packet P1 in the VPN 120. The PE router 111 looks up entry {VPN 120, 112} in its FTN Table (e.g., table 4 above) and the action in the FTN entry pushes VPN-Label L2C onto the packet P1. Further, the PE router 111 decides to tunnel the VPN labelled packet P1 to the PE router 112 via LSP_BC, so the PE router 111 looks up the FTN entry for LSP_BC and the action in the FTN entry pushes label LBC_E to send the packet P1 to the LSP's next-hop, which is the P router 101. The PE router 111 sends the resultant packet {LBC_E, L2C, P1} is finally sent to the P router 101. By convention, the left most label is the outermost label in the label stack.

In response to receiving the packet P1, the router 101 looks up the ILM entry for LBC_E in its ILM Table. The action in the ILM entry swaps the LSP label LBC_E with LBC_G towards the router 103 and the router 101 sends the resultant packet {LBC_G, L2C, P1} to the router 103. In response to receiving the packet P1 from the router 101, the router 103 swaps the LSP label LBC_G with LBC_C towards the PE router 112 and the router 103 sends of the resultant packet {LBC_C, L2C, P1} to the PE router 112. In response to receiving the packet P1 from the router 103, the PE router 112 looks up the topmost label LBC_C in its ILM Table (e.g., table 7 above). The ILM entry indicates termination of LSP_BC, so the PE router 112 pops label LBC_C and then finds another label L2C, which causes the PE router 112 to look up the label L2C in its ILM Table. The ILM entry for L2C indicates the PE router 112 as the egress router for VPN 120, so the PE router 112 pops the label L2C from the packet P1. The PE router 112 then looks up the destination address of the resultant packet P1 in the forwarding table for VPN 120 (e.g., the NVFT 405), which results in forwarding the packet P1 to CE router 123.

For another example, if the CE router 132 forwards a packet "P2" to PE router 111 via access link 152, the PE router 111 associates the packet P2 with the VPN 130 since the access link 152 is assigned to VPN 130. In response to receiving the packet P2, the PE router 111 looks up the forwarding table for VPN 130 (e.g., the NVFT 410) to make forwarding decision for the packet P2 based on its destination address. Based on the lookup, the PE router 111 decides to unicast the packet P2 to PE router 112, which is the next-hop for the packet P2 in the VPN 130. The PE router 111 looks up the entry {VPN 130, 112} in its FTN Table (e.g., table 4 above) and the action in the FTN entry pushes VPN label L3C onto the packet P2. The PE router 111 decides to tunnel the VPN labelled packet to PE router 112 via LSP_BC, so the PE router 111 looks up the FTN entry for LSP_BC and the action in the FTN entry pushes it pushes label LBC_E to send the packet P2 to the LSP's next-hop, which is the router 101. The PE router 111 sends the resultant packet {LBC_E, L3C, P2} to the router 101.

In response to receiving the packet P2, the router 101 looks up the ILM Table for topmost label LBC_E. The action in the ILM entry swaps the LSP label LBC_E with LBC_G towards the router 103 and the router 101 sends the resultant packet {LBC_G, L3C, P2} to the router 103. In response to receiving the packet P2 from the router 101, the router 103 swaps the LSP label LBC_G with LBC_C towards the PE router 112 and the router 103 sends the resultant packet {LBC_C, L3C, P2} to the PE router 112. In response to receiving the packet P2, the PE router 112 looks up the topmost label LBC_C in its ILM Table (e.g., table 5 above). The ILM entry indicates that the PE router 112 is the termination of LSP_BC, so the PE router 112 pops the label LBC_C and finds another label L3C in the packet P2. Consequently, the PE router 112 looks up that label in its ILM Table. The ILM entry for L3C indicates that the PE router 112 is an egress router for VPN 130, so the PE router 112 pops the label L3C from the packet P2. The PE router 112 then looks up the destination address of the resultant packet P2 in the forwarding table for VPN 130 (e.g., the NVFT 410), which results in forwarding the packet P2 to the CE router 133.

Some embodiments of the VPNs 120, 130 multicast packets to subsets of the VPN sites 120, 130. When the subset of remote sites includes all the remote VPN site 120, 130 then the multicast transmission is usually termed as "broadcast." As used herein, the term "multicast" refers to any transmission that requires a packet to be sent to more than one receiver (or remote site). For example, in EVPN, Broadcast, Unlearned Unicast, Multicast (BUM) ethernet packets are flooded by a PE router 110-113 to all remote PE routers 110-113. In IP VPN, the CE routers 121-124, 131-134 receive Internet Group Management Protocol (IGMP) join requests from a local area network (LAN) in the VPN site for the interested IP multicast groups. The CE routers 121-124, 131-134 run Protocol Independent Multicast (PIM) protocol with the PE router 110-113 connected to the corresponding CE router 121-124, 131-134. The IGMP join from the LAN triggers PIM join to the PE router 110 F 113. In response to the IGMP join request, the PE router 110-113 installs the IP multicast group IP address into VRF with the CE router 121-124, 131-134 as leaf. The PE router 110-113 becomes the egress/leaf for the multicast group with respect to all remote/ingress PE routers 110-113 in the VPN 120, 130. The egress PE router 110-113 then advertises the group address to all ingress PE routers 110-113 via BGP in the context of the VPN 120, 130. In some embodiments, multiple PE routers 110-113 advertise interest for the multicast group. When an ingress PE router 110-113 receives an IP packet from a CE router 121-134, 131-134 with the destination IP address as multicast group address then it looks up the VRF of the corresponding VPN 120, 130 to multicast the packet to interested egress PE routers 110-113.

Multicast packets are transmitted from an ingress PE router 110-113 to a subset of egress PE routers 110-113 using (1) multicast with ingress replication, (2) exclusive MDT per VPN (1:1 mapping), or (3) aggregating multiple VPNs on a single MDT (N: 1 mapping). Example implementations of these multicast methods are disclosed below.

In multicast with ingress replication, an ingress PE router 110-113 replicates a copy of the packet to the each of the remote PE routers 110-113. Each copy of the multicast packet is forwarded to the respective PE router 110-113 as a unicast packet. For example, if the CE router 122 forwards a packet P3 to the PE router 111 via access link 142, the PE router 111 associates the packet P3 with VPN 120 since the access link 142 is assigned to VPN 120. The PE router 111 looks up the destination address of the packet P3 in the forwarding table of VPN 120 and, based on the lookup, the PE router 111 determines that the packet P3 is to be multicast to the remote PE routers 110,112,113. The PE router 111 then unicasts a copy of the packet P3 to each of the PE routers 110,112,113 as follows:

A first copy of the packet P3 (destined to the PE router 110) is sent on LSP_BA as {LBA_E, L2A, P3}.
A second copy of the packet P3 (destined to PE router 112) is sent on LSP_BC as {LBC_E, L2C, P3}.
A third copy of the packet P3 (destined to PE router 113) is sent on LSP_BD as {LBD_E, L2D, P3}.

The first, second, and third copies are conveyed independently using procedures similar to those disclosed herein for unicast packets.

Ingress replication-based multicast puts the entire replication load on the ingress PE routers 110-113 and does not optimize multicast routing across the service public network. For example, the LSP_BA, LSP_BC, LSP_BD traverse the common link between the PE router 111 and the router 101. Thus, three unicast copies of the packet P3 traverse the same link, which is sub-optimal and consumes three times the actual required bandwidth. Similarly, LSP_BC and LSP_BD traverse the common link between the router 101 and the router 103. In a typical VPN deployment, it is quite often that a packet needs to be multicast to 50 remote PE routers. In that case 50 unicast copies of the packet are sent by the ingress PE router. If the flow associated with the packet is sent at the rate of 1 Gbps and all 50 copies traverse a common link of 10 Gbps along their paths then the demand put on that link would be 50 Gbps. This would result in dropping of packets on that oversubscribed links, which impacts all other packet flows on that link.

In VPN multicast with an MDT, an MDT is constructed among the PE routers 110-113 on the VPN 120, 130. Some embodiments of an MDT are implemented as a Point-to-Multipoint (P2MP) tree with an ingress router (also called the root) and branches forming a spanning tree through the network to egress routers (also called a leaf). The MDT branches out only when it is required to take a diverse path to a subset of egress routers. The ingress router always sends a single copy of the packet on the MDT, which is replicated only at the branches on the MDT. The MDT ensures that only one copy of the packet traverses a specific link, so bandwidth is used optimally. Some embodiments of the MDT are implemented as a Multipoint-to-Multipoint (MP2MP) tree wherein each leaf is also a root, so any router participating in the MP2MP tree can send packets to other participants as well as receive from other participants. A MP2MP MDT is also referred to as Any Source Multicast (ASM) tree.

Figure 5:
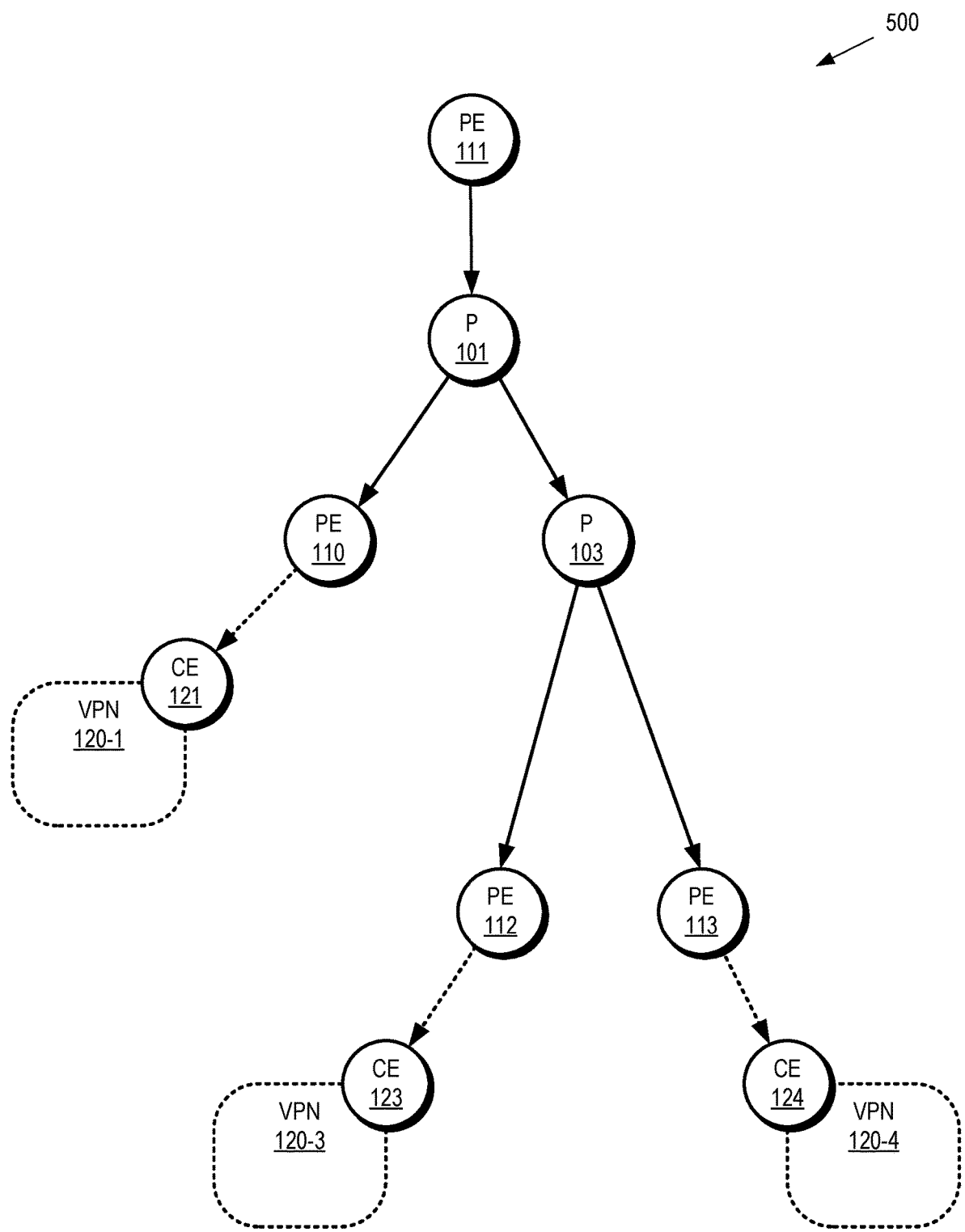
FIG. 5 is a block diagram of a multicast distribution tree (MDT) that is constructed for multicasting packets from the PE router for the VPN according to some embodiments.

FIG. 5 is a block diagram of an MDT 500 that is constructed for multicasting packets from the PE router 111 for the VPN 120 according to some embodiments. The MDT 500 is implemented as a P2MP tree and traffic on the MDT 500 flows from the ingress PE router 111 to the egress PE routers 110, 112, 113. In the illustrated embodiment, a single copy of the multicast packet is conveyed from the PE router 111 to the router 101, which generates two copies of the multicast packet. The router 101 forwards a copy of the multicast packet to the PE router 110, which forwards a copy of the packet to the CE router 121 associated with the VPN site 120-1. The router 101 forwards another copy of the multicast packet to the router 103, which generates two copies of the multicast packet. The router 103 sends one copy of the multicast packet to the PE router 112, which forwards a copy of the packet to the CE router 123 associated with the VPN site 120-3. The router 103 sends another copy of the multicast packet to the PE router 113, which forwards a copy of the packet to the CE router 124 associated with the VPN site 120-4.

Some embodiments of the MDT are implemented in the communication system 100 shown in FIG. 1 using one of the following types:
  stateful IP based multicast tree such as signaled by PIM protocol.
  a stateful P2MP LSP such as signaled by mLDP or P2MP RSVP-TE.
  a stateful MP2MP LSP such as signaled by mLDP.
  a stateless multicast tree using Bit indexed explicit replication (BIER).

In the interest of clarity, the following discussion discloses MDT's that are implemented using MPLS, which are generically referred as MultiPoint (MP) LSPs that include both P2MP and MP2MP LSP types. The MP LSP is a stateful P2MP LSP signaled by mLDP, which uses leaf initiated LSP setup with reverse path signaling (i.e label mapping) towards the root. As used herein, the term "reverse path" means the direction of signaling is opposite to the direction of traffic flow. Thus, the egress PE routers 110, 112, 113 initiate signaling towards the ingress PE router 111. The signaling messages follow the shortest path towards the ingress PE router 111. This P2MP LSP is denoted as {111, MLSP_1} using the general format {<root>, <some form of a MP LSP identifier>}.

The communication system 100 performs signaling (setup) of the MDT as follows:
  Egress PE router 112 sends label mapping for {111, MLSP_1} with label ML_112_1 to upstream router 103, which is the shortest path next-hop towards the root PE router 111 in its unicast routing table.
  Egress PE router 113 sends label mapping for {111, MLSP_1} with label ML_113_1 to upstream router 103, which is the shortest path next-hop towards root 111 in its unicast routing table.
  On receipt of label mappings from the PE routers 112 and 113, router 103 merges the label mappings such that the router 103 becomes the branching point for the PE routers 112 and 113. The router 103 then sends label mapping for {111, MLSP_1} with label ML_103_1 to upstream router 101, which is the shortest path next-hop towards root PE router 111 in its unicast routing table.
  Egress PE router 110 sends label mapping for {111, MLSP_1} with label ML_110_1 to upstream router 101, which is the shortest path next-hop towards root PE router 111 in the unicast routing table.
  On receipt of label mappings from the PE router 110 and the router 103, router 101 merges the label mappings such that the router 101 becomes the branching point for the PE router 110 and the router 103. The router 101 then sends label mapping for {111, MLSP_1} with label ML_101_1 to upstream PE router 111, which is the shortest path next-hop towards root PE router 111 in its unicast routing table.
  When the PE router 111 receives label mapping from the router 101 for {111, MLSP_1}, it identifies itself as the root and the formation of the P2MP LSP is complete.

Now any packet can be multicast from the ingress PE router 111 to the egress PE routers 110, 112, 113 by using the P2MP LSP as follows:
  The packet is sent from the PE router 111 to the router 101 with label ML_101_1. On receipt of the packet, the router 101 replicates the packet into two copies:
    Copy 1: Incoming label ML_101_1 is swapped with label ML_110_1 and is sent to branch next-hop PE router 110.
    Copy 2: Incoming label ML_101_1 is swapped with label ML_103_1 and is sent to branch next-hop router 103.
  When Copy 1 is received by the PE router 110, the label ML_110_1 identifies that it is the egress router for the P2MP LSP {111, MLSP_1}. So, the PE router 110 pops label ML_110_1 and the resultant packet is delivered to the context associated with the LSP.
  On receipt of Copy 2 by the router 103, it replicates the packet into two copies:
    Copy 3: Incoming label ML_103_1 is swapped with label ML_112_1 and is sent to branch next-hop PE router 112.
    Copy 4: Incoming label ML_103_1 is swapped with label ML_113_1 and is sent to branch next-hop PE router 113.
  When Copy 3 is received by the PE router 112, the label ML_112_1 identifies that it is the egress router for the P2MP LSP {111, MLSP_1}. So, the PE router 112 pops label ML_112_1 and the resultant packet is delivered to the context associated with the LSP.
  When Copy 4 is received by the PE router 113, the label ML_113_1 identifies that it is the egress router for the P2MP LSP {111, MLSP_1}. So, the PE router 113 pops the label ML_113_1 and the resultant packet is delivered to the context associated with the LSP.

Since each egress PE router advertises its own VPN-Label from its local label space, so the VPN-Labels cannot be used to multiplex multicast packets from multiple VPNs on a single MDT. So, one solution is to dedicate an MDT exclusively to a VPN for sending its multicast traffic. In that case, an MDT is configured in its ingress and egress/leaf routers to send and receive traffic exclusively for a VPN. The ingress router sends the VPN packet on the MDT without any VPN-Label, i.e the VPN packet with the native header is sent with the MDT specific encapsulation only. When an egress/leaf router of the MDT receives the packet, it identifies the associated VPN by the MDT itself due to 1:1 mapping configured in the egress router between the VPN and the MDT. If a VPN has multicast flow states with disjoint subsets of egress PE routers then the VPN may use one dedicated MDT for each disjoint subset of egress PE routers.

In FIG. 1, the VPN-Labels cannot be used to multiplex multicast packets from multiple VPNs on a single MDT because each egress PE router 110-113 advertises its own VPN-Label from its local label space. Thus, in some embodiments, an MDT is dedicated exclusively to a VPN (1:1 mapping) for sending multicast traffic for the VPN. If a VPN has multicast flow states with disjoint subsets of egress PE routers 110-113 then the VPN uses one dedicated MDT for each disjoint subset of egress PE routers 110-113. For example, if the egress PE routers 110, 112, 113 of the P2MP LSP {111, MLSP_1} are pinned to receive traffic for VPN 120 only, any packet received on the P2MP LSP by the egress PE routers 110-113 is directly looked up in the forwarding table of VPN 120 to make further forwarding decisions. The ingress router 111 of the P2MP LSP {111, MLSP_1} is pinned to send traffic for VPN 120 only. Since the P2MP LSP is dedicated for VPN 120, no VPN specific label is pushed before forwarding the packet on the P2MP LSP. The VPN packet with its "native" header is directly sent on the P2MP LSP, with the P2MP LSP specific label only.

Routing of a multicast packet P4 that is received at the PE router 111 from the CE router 122 proceeds as follows:

The CE router 122 forwards a packet P4 to the PE router 111 on access link 142. The ingress PE router 111 associates the packet P4 with the VPN 120 because the link 142 is configured for VPN 120.

The PE router 111 looks up the destination address of the packet P4 in the forwarding table of VPN 120 and decides to multicast the packet to egress PE routers 110, 112, 113 via P2MP LSP {111, MLSP_1}. The PE router 111 pushes the LSP's next-hop label ML_101_1 and sends the resultant packet {ML_101_1, P4} to the router 101.

On receipt of the packet, the router 101 replicates the packet into two copies:

Copy 1: Incoming label ML_101_1 is swapped with label ML_110_1 and the resultant packet {ML_110_1, P4} is sent to branch next-hop PE router 110.

Copy 2: Incoming label ML_101_1 is swapped with label ML_103_1 and the resultant packet {ML_103_1, P4} is sent to branch next-hop router 103.

When Copy 1 is received by the PE router 110, the label ML_110_1 identifies that it is the egress router for the P2MP LSP {111, MLSP_1} which is tied to VPN 120. So, the PE router 110 pops label ML_110_1 and forwards the packet P4 to the router 103 by looking up the forwarding table of VPN 120.

On receipt of Copy 2 by the router 103, it replicates the packet into two copies:

Copy 3: Incoming label ML_103_1 is swapped with label ML_112_1 and the resultant packet {ML_112_1, P4} is sent to branch next-hop 112.

Copy 4: Incoming label ML_103_1 is swapped with label ML_113_1 and the resultant packet {ML_113_1, P4} is sent to branch next-hop 113.

When Copy 3 is received by the PE router 112, the label ML_112_1 identifies that the PE router 112 is the egress router for the P2MP LSP {111, MLSP_1} which is tied to VPN 120, and so the PE router 112 pops label ML_112_1 and forwards the packet P4 to CE router 123 by looking up the forwarding table of VPN 120.

When Copy 4 is received by the PE router 113, the label ML_113_1 identifies that the PE router 113 is the egress router for the P2MP LSP {111, MLSP_1} which is tied to VPN 120, and so the PE router 113 pops label ML_113_1 and forwards the packet P4 to CE router 124 by looking up the forwarding table of VPN 120.

One drawback to allocating an exclusive MDT for each VPN is the scalability of MDTs at the core of the network. The number of MDTs required is at least the number of VPNs provisioned across the PE routers 110-113, which is equivalent to pushing VPN specific states to the core of the network, e.g., the routers 101-104. This drawback is addressed by aggregating or multiplexing multicast flows from multiple VPNs 120, 130 on a single MDT. The egress routers of the MDT are common egress routers for the aggregated flows. The ingress PE router therefore pushes a VPN specific label before pushing the MDT encapsulation on the packet, based on which egress routers can demultiplex the VPN associated with a received packet. Since each egress router would receive the same VPN specific label, this label cannot be allocated from the local label space of an egress PE router 110-113. Instead, the ingress PE router 110-113 allocates the label, which is referred to herein as an "upstream assigned label" (UAL). The UAL is allocated from an "upstream assigned label space" at the PE router 110-113 because the UAL does not belong to the local label space (which is the space for downstream assigned labels) of the PE router 110-113. As used herein, the term "upstream" in the upstream assigned label space refers to the root/ingress router of the MDT.

In operation, an ingress PE router 110-113 is allocated an UAL for each VPN from its upstream assigned label space. The ingress PE router 110-113 advertises the UAL to all remote PE routers 110-113 which allows the ingress PE router 110-113 to send multicast packets for the VPN over an MDT with that UAL to the remote PE routers 110-113. The remote PE routers 110-113 maintain an "upstream ILM Table" for the ingress PE router 110-113. The UAL advertised by the ingress PE router 110-113 is programmed and mapped to the context, i.e., the VPN. In some embodiments, the PE routers 110-113 operate as ingress routers for multicast flows in a VPN and so each PE router 110-113 advertises a UAL for a VPN to rest of the PE routers 110-113, which program an upstream ILM Table for each of the remote PE routers 110-113. The upstream ILM tables for the UAL are programmed by the PE routers 110-113 in addition to the default ILM Table disclosed herein. In response to receiving a labelled packet on an MDT underneath the MDT encapsulation (e.g., if MDT is P2MP LSP then MDT encapsulation is the label of the LSP) the egress PE router 110-113 assumes the next label to be a UAL. Then the egress PE router 110-113 looks up the UAL in the upstream ILM Table programmed for the ingress/root of the MDT, to determine the context/VPN associated with the UAL.

Figure 6:
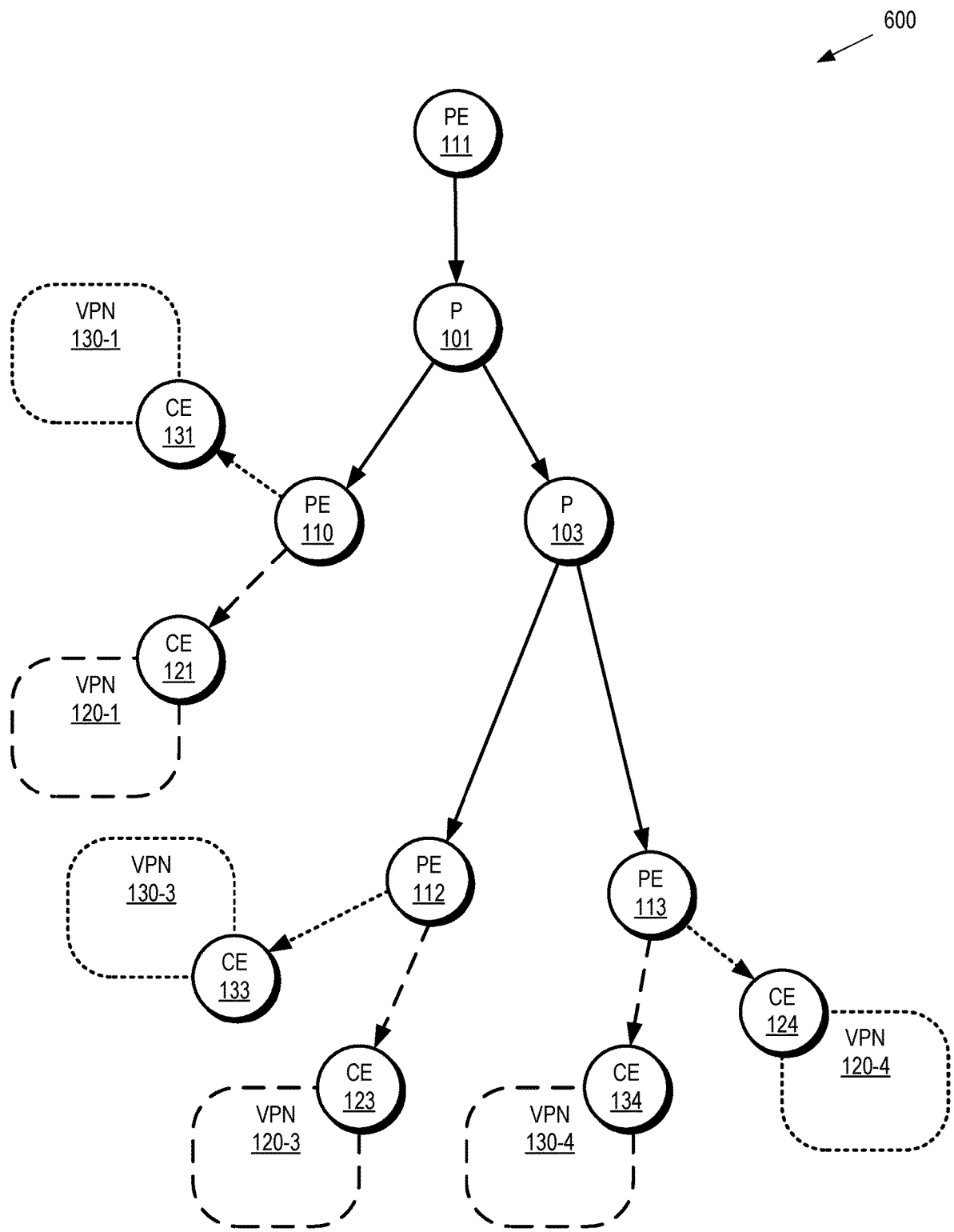
FIG. 6 is a block diagram of an aggregate MDT that is constructed for multicasting packets from the PE router for multiple VPNs according to some embodiments.

FIG. 6 is a block diagram of an aggregate MDT 600 that is constructed for multicasting packets from the PE router 111 for multiple VPNs 120, 130 according to some embodiments. The aggregate MDT 600 is implemented in some embodiments of the communication system 100 shown in FIG. 1. In the illustrated embodiment, the PE router 111 aggregates multicast traffic from multiple VPNs 120, 130 on a single MDT 600. The PE router 111 also assigns a UAL per VPN 120, 130 from its upstream assigned label space. This is in addition to the VPN-Label allocated from its local label space to receive unicast traffic on the VPN 120, 130 from remote PE routers 110, 112, 113. The PE router 110-113 allocates UAL labels for VPN 120 and VPN 130 as follows (The UALs are denoted by mnemonic UAL_<VPN Number>_<Upstream PE Router>).
VPN 120
110=UAL_120_110, 111=UAL_120_111, 112=UAL_120_112, 113=UAL_120_113.
VPN 130
110=UAL_130_110, 111=UAL_130_111, 112=UAL_130_112, 113=UAL_130_113.

Each PE router 110-113 advertises the UALs to remote PE routers 110-113 in the context of respective VPNs 120, 130 using signalling protocols such as BGP, LDP, and the like. On receipt of the advertisement of UAL from a remote/upstream PE router, the PE routers 110-113 program the UAL into a corresponding upstream ILM Table for the remote/upstream PE router 110-113.

Tables 10-13 disclose the resultant upstream ILM Tables at PE router 112 and table 14 discloses the default ILM Table at the PE router 112. In a similar manner, the PE routers 110,111,113 maintain upstream ILM Tables for their respective remote PE routers.

TABLE 10

| PE Router 112: Upstream ILM Table for 110 | |
|---|---|
| UAL | Context |
| ... | ... |
| UAL_120_110 | VPN 120 |
| ... | ... |
| UAL_130_110 | VPN 130 |
| ... | ... |

TABLE 11

| PE Router 112: Upstream ILM Table for 111 | |
|---|---|
| UAL | Context |
| ... | ... |
| UAL_120_111 | VPN 120 |
| ... | ... |
| UAL_130_111 | VPN 130 |
| ... | ... |

TABLE 12

| PE Router 112: Upstream ILM Table for 113 | |
|---|---|
| UAL | Context |
| ... | ... |
| UAL_120_113 | VPN 120 |
| ... | ... |
| UAL_130_113 | VPN 130 |
| ... | ... |

TABLE 13

| 112: ILM Table | | | |
|---|---|---|---|
| | NHLFE | | |
| Label | Next-Hop | Next-Hop Label | Context |
| ... | ... | ... | ... |
| L2C | Self | None | VPN 120 |
| ... | ... | ... | ... |

TABLE 13-continued

| 112: ILM Table | | | |
|---|---|---|---|
| | NHLFE | | |
| Label | Next-Hop | Next-Hop Label | Context |
| L3C | Self | None | VPN 130 |
| ... | ... | ... | ... |
| LAC_C | Self | None | LSP_AC |
| ... | ... | ... | ... |
| LBC_C | Self | None | LSP_BC |
| ... | ... | ... | ... |
| LDC_C | Self | None | LSP_DC |

If CE router 122 forwards a packet P5 to PE router 111 over the access link 142, the PE router 110 associates the packet with VPN 120. The PE router 111 looks up the forwarding table of VPN 120 which results in multicast of the packet P5 to PE routers 110, 112, 113. The PE router 111 decides to multicast the packet using P2MP LSP {111, MLSP_1} that bears the respective PE routers as leaves and the PE router 111 pushes the UAL label UAL_120_111 assigned to VPN 120 onto the packet P5. The PE router 111 then pushes the P2MP LSP label ML_101, and sends the resultant packet {ML_101, UAL_120_111, P5} to the router 101.

On receipt of the packet, the router 101 looks up the outermost label ML_101_1 in its ILM Table which results in replicating the packet into following two copies:
  Copy 1: The outermost label ML_101_1 is swapped with label ML_110_1. The resultant packet {ML_110_1, UAL_120_111, P5} is sent to branch next-hop PE router 110.
  Copy 2: The outermost label ML_101_1 is swapped with label ML_103_1 and the resultant packet {ML_103_1, UAL_120_111, P5} is sent to branch next-hop router 103.
When Copy 1 is received by the PE router 110, the outermost label ML_110_1 identifies that the PE router 110 is the leaf router for the P2MP LSP {111, MLSP_1}. The PE router 110 therefore pops label ML_110_1 and finds label UAL_120_111 underneath. The root of the P2MP LSP is the PE router 111, so the PE router 110 looks up UAL_120_111 in the upstream ILM Table for the PE router 111, which results in association of the packet with VPN 120. The PE router 110 pops UAL_120_111 and forwards P5 to CE router 122 by looking up the forwarding table of VPN 120.
On receipt of Copy 2 by the router 103, the router 103 looks up the outermost label ML_103_1 in its ILM Table which results in replicating the packet into following two copies:
  Copy 3: The outermost label ML_103_1 is swapped with label ML_112_1 and the resultant packet {ML_112_1, UAL_120_111, P5} is sent to branch next-hop PE router 112.
  Copy 4: The outermost label ML_103_1 is swapped with label ML_113_1 and the resultant packet {ML_113_1, UAL_120_111, P5} is sent to branch next-hop PE router 113.
When Copy 3 is received by the PE router 112, the outermost label ML_112_1 identifies that the PE router 112 is the leaf router for the P2MP LSP {111, MLSP_1}. The PE router 112 therefore pops label ML_112_1 and finds label UAL_120_111 underneath.

The root of the LSP is the PE router 111, so the PE router 112 looks up UAL_120_111 in the upstream ILM Table for 111 (table 11) which results in association of the packet with VPN 120. The PE router 112 pops label UAL_120_111 and forwards P5 to CE router 123 by looking up the forwarding table of VPN 120.

When Copy 4 is received by the PE router 113, the outermost label ML_113_1 identifies that the PE router 113 is the leaf router for the P2MP LSP {111, MLSP_1}. The PE router 113 therefore pops label ML_113_1 and finds label UAL_120_111 underneath. The root of the LSP is the PE router 111, so the PE router 113 looks up UAL_120_111 in the upstream ILM for the PE router 111 which results in association of the packet with VPN 120. The PE router 113 pops label UAL_120_111 and forwards the packet P5 to CE router 124 by looking up the forwarding table of VPN 120.

If the CE router 132 forwards a packet P6 to PE router 111 over the access link 152, the PE router 111 associates the packet with VPN 130. The PE router 111 looks up the forwarding table of VPN 130, which results in multicast of the packet to PE routers 110, 112, 113. The PE router 111 decides to multicast the packet using P2MP LSP {111, MLSP_1} that bears the respective PE routers as leaves. The PE router 111 pushes the UAL label UAL_130_111 assigned to VPN 130 onto the packet P6 and then pushes the P2MP LSP label ML_101, and sends the resultant packet {ML_101, UAL_130_111, P6} to router 101. This packet is forwarded along the P2MP LSP and processed by leaf routers in a similar fashion described for packet P5. In a similar manner, the other PE routers 110, 112, 113 can aggregate multicast packets from multiple VPNs to a subset of remote PE routers using respective UALs assigned to the VPNs and an MDT (rooted at the PE router and remote PE router as the leaves).

There are a number of drawbacks to the conventional method of aggregating multiple VPNs 120, 130 onto a single MDT 600. First, each of the PE routers 110-130 allocates a UAL for the VPNs 120, 130 to support multicasting of packets. Consequently, the PE routers 110-113 manage an upstream assigned label space in addition to their local label space. Second, every PE router participating in a VPN maintains an Upstream ILM for each remote PE router. If a system supports N VPNs among M PE routers, then a PE router needs to maintain (M−1) upstream ILMs and each ILM contains at least N entries. The ILMs require additional forwarding state for N×(M−1) ILM entries, which is not optimal for the states to be maintained in the forwarding plane because N could be 64K or more and M could be 50 or more.

Third, the implementation and lookup of Upstream ILM Table is complex and unlike the default ILM for downstream assigned labels. The local label space is a linear space of labels in a specific range and so a default ILM Tables are implemented as arrays that require O(1) lookup to process a downstream assigned VPN-Label. Although upstream assigned label space is linear with respect to the upstream router, it is not possible to maintain an Upstream ILM Table as an array because:

The size of the upstream label space at the upstream router is unknown to the downstream PE router.

Even though a size of the upstream label space could be advertised by the upstream PE router through modifications to VPN signaling protocols, it is not optimal to keep (M−1) Upstream ILM Tables as an array. Consequently, the Upstream ILM Tables are typically implemented in compressed (space conserving form) such as hash table or other form of key→value-based lookup method that uses the UAL as the key. That makes implementation of Upstream ILM Table and lookup of UAL costly.

FIGS. 1-21 therefore disclose a system and techniques that aggregate multicast packets from multiple VPNs on a single MDT without upstream assigned label space, UALs or Upstream ILM Tables. Aggregation of the multicast packets onto a single MDT is supported using a single downstream assigned VPN-Label per VPN and the VPN-Label is used to send and receive both unicast and multicast packets.

To support aggregation of the multicast packets for multiple VPNs 120, 130 onto a single MDT, the PE routers 110-113 reserve one or more a blocks of labels from their local label space for allocating VPN-Labels. The reserved block of labels is referred to as a "Label Block" (LB). Each LB is assigned a network wide unique Label Block Identifier (LBI) and a size that indicates a number of contiguous labels included in the LB. The PE routers 110-113 independently configure the LB assigned with an LBI and size. Some embodiments of the PE routers 110-113 map the LB into an arbitrary range of contiguous labels in their corresponding local label spaces. Although maximum label range of MPLS labels is 0-1048575, some embodiments of the PE routers 110-113 do not support that entire maximum range. For example, some PE routers 110-113 support only 256K labels and in that circumstance the PE routers 110-113 create the local label space from any range within the maximum space, such as 512K-768K. Consequently, in some cases the size and range of local label space is disjoint among the PE routers 110-113, which naturally makes the range of LB arbitrary at each PE router 110-113 as well. There could be applications other than VPN that may use an LB. For such applications each PE router may configure a separate LB.

In some embodiments, a single LB of size N labels is created with LBI=0 and N is the maximum number of VPNs possible in the network. The PE routers map the LB to their respective local label spaces as follows:

PE router 110: label range 1000 to (1000+N)
PE router 111: label range 4000 to (4000+N)
PE router 112: label range 6000 to (6000+N)
PE router 113: label range 8000 to (8000+N)

A "Label Index" (LI) indicates an index of a label within a LB relative to the LBI. The value of the LI is assigned in the range of 0 to (size of LB−1). If an LB is exclusively assigned for VPNs, then the LB is referred to as a "VPN-LB" and accordingly the other terminology follows such as VPN-LBI, VPN-LI etc. A VPN 120, 130 is assigned an additional network wide unique identifier (apart from VPN-ID) as {VPN-LBI, VPN-LI}. Thus, the VPNs 120, 130 are assigned the same {VPN-LBI, VPN-LI} at each PE router 110-113 associated with the VPNs 120, 130. For example, if VPN 120 is assigned {VPN-LBI=0, VPN-LI=120} and VPN 130 is assigned {VPN-LBI=0, VPN-LI=130}, then PE routers 110-113 allocate a VPN-Label as follows:

VPN-Label=Starting label of VPN-LB identified by VPN-LBI+VPN-LI.

The VPN-Label allocated by the PE routers 110-113 for VPN 120 are as follows:
PE router 110: 1000+120=1120
PE router 111: 4000+120=4120
PE router 112: 6000+120=6120
PE router 113: 8000+120=8120

The VPN-Label allocated by the PE routers 110-113 for VPN 130 are as follows:
PE router 110: 1000+130=1130
PE router 111: 4000+130=4130
PE router 112: 6000+130=6130
PE router 113: 8000+130=8130

Thus, the PE routers 110-113 allocate their own VPN-Label from their local label spaces based on the network wide {VPN-LBI, VPN-LI} assigned to the VPN. The PE routers 110-113 program the allocated VPN-Label in their default ILM Tables. When signaling the VPN (i.e., label mapping for the VPN) between two PE routers, the {VPN-LBI, VPN-LI} is exchanged against the VPN-ID, instead of the VPN-Label. Consequently, the VPN-Labels remain private to the PE routers 110-113, which advertise {VPN-LBI=0, VPN-LI=120} for VPN 120 and {VPN-LBI=0, VPN-LI=130} for VPN 130. The PE routers 110-113 ensure that {VPN-LBI, VPN-LI} as advertised by the remote PE routers 110-113 associated with the VPN are consistent.

In some embodiments, an "Offset Label" (OL) is sent in packets such as MPLS packets. An OL indicates the index of a label in the receiver's predefined LB. Thus, the OL is encoded in the context of LB as the tuple of two labels {<LBI>, OL}. The tuple is denoted as Offset Label Stack (OLS). In an OLS, the LBI is enclosed in "< >" to indicate that LBI is OPTIONAL and is not necessarily transmitted as part of the tuple. For example, if LBI is 0 then the LBI need not be sent in OLS. When a receiver receives an OLS without an LBI, it is implicit that LBI is 0. This reduces the overhead when the OL is sent in the context of LBI 0. When a receiver receives OLS, it computes the corresponding label for lookup in its default ILM as follows:

Label for lookup=Starting label of LB identified by LBI+ OL.

When a PE router sends a packet for a VPN to another PE router then {VPN-LBI, VPN-LI} of the VPN is encoded into the packet as OLS, e.g., {<LBI=VPN-LBI>, OL=VPN-LI}, instead of a conventional VPN-Label. Consequently, the same OLS is encoded in unicast packets for the VPN among any pair of PE routers 110-113 as each receiving PE router translates the OLS to the actual label in its local label space. This also occurs for multicast packets in the VPN 120, 130 since each egress PE router 110-113 of the multicast packet translates the OLS to the actual label in its local label space, which allows multicast packets from multiple VPNs to be aggregated on a single MDT using the OLS values of the respective VPNs 120, 130, as each egress PE router 110-113 of the MDT can map an OLS to its corresponding VPN 120, 130. Thus, a single downstream assigned VPN-Label is used to receive both unicast and multicast packets for a VPN without requiring assignment of a UAL.

Figure 7:
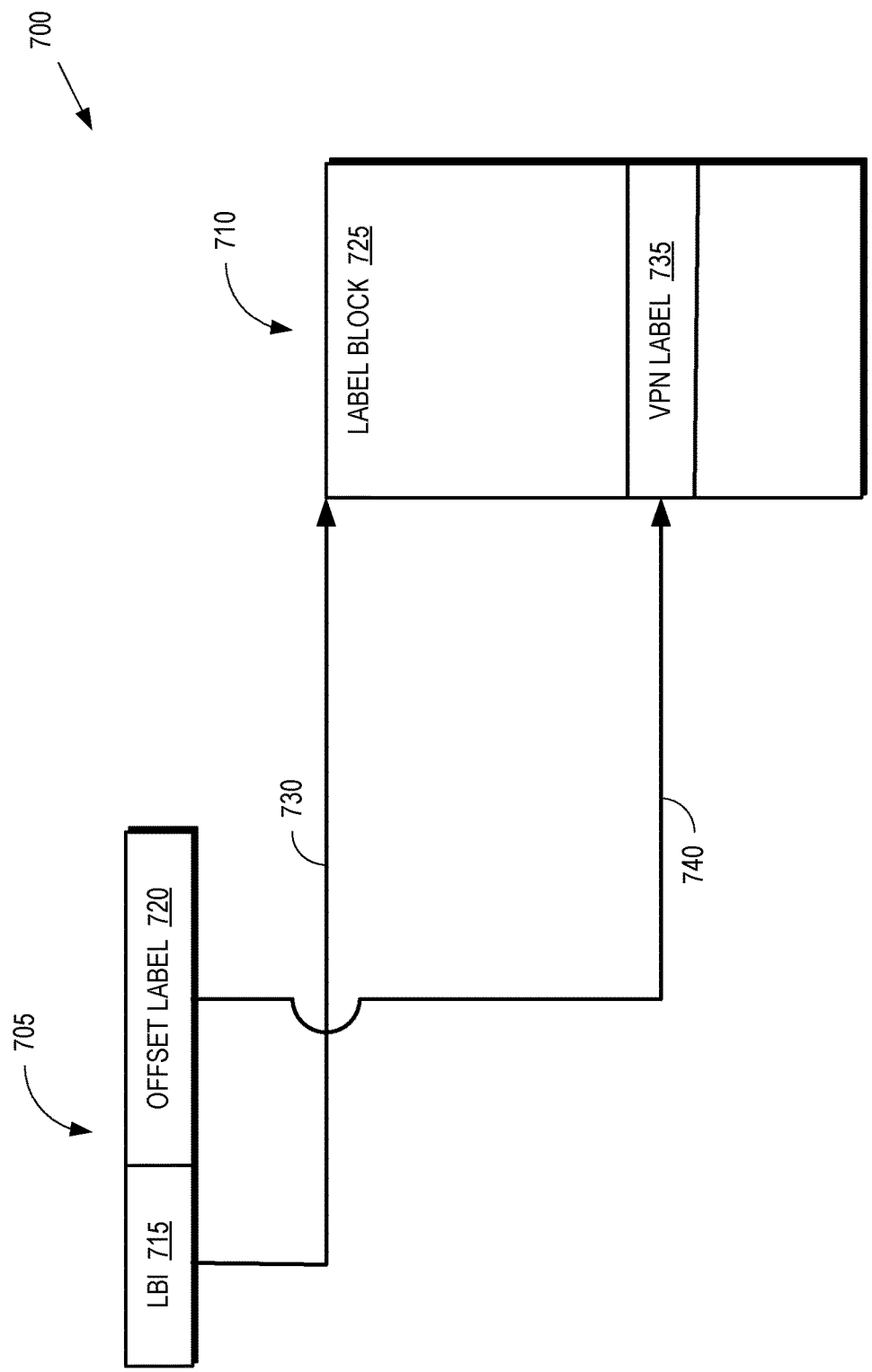
FIG. 7 is a block diagram of a mapping of an offset label stack (OLS) to a local label space in a PE router according to some embodiments.

FIG. 7 is a block diagram of a mapping 700 of an OLS 705 to a local label space 710 in a PE router according to some embodiments. In the illustrated embodiment, the OLS 705 is read from a header of a packet that is received by the PE router. The OLS 705 includes an LBI 715 and an offset label 720. However, as discussed herein, some embodiments of the OLS 705 do not include the LBI 715 if the value of the LBI 715 is zero (or another default value). The LBI 715 indicates a location, such as a base address, of a label block 725 in the local label space 710 of the PE router, as indicated by the arrow 730. The offset label 720 indicates a location of a VPN label 735 relative to the location indicated by the LBI 715, as indicated by the arrow 740. The location of the VPN label 735 in the local address space 710 is therefore identified by the combination of the LBI 715 and the offset label 720 in the tuple 705. As discussed herein, different PE routers use different mappings of the tuple 705 to locations in their corresponding local label spaces, e.g., by associating different base addresses in their local label spaces with the LBI 715.

Figure 8:
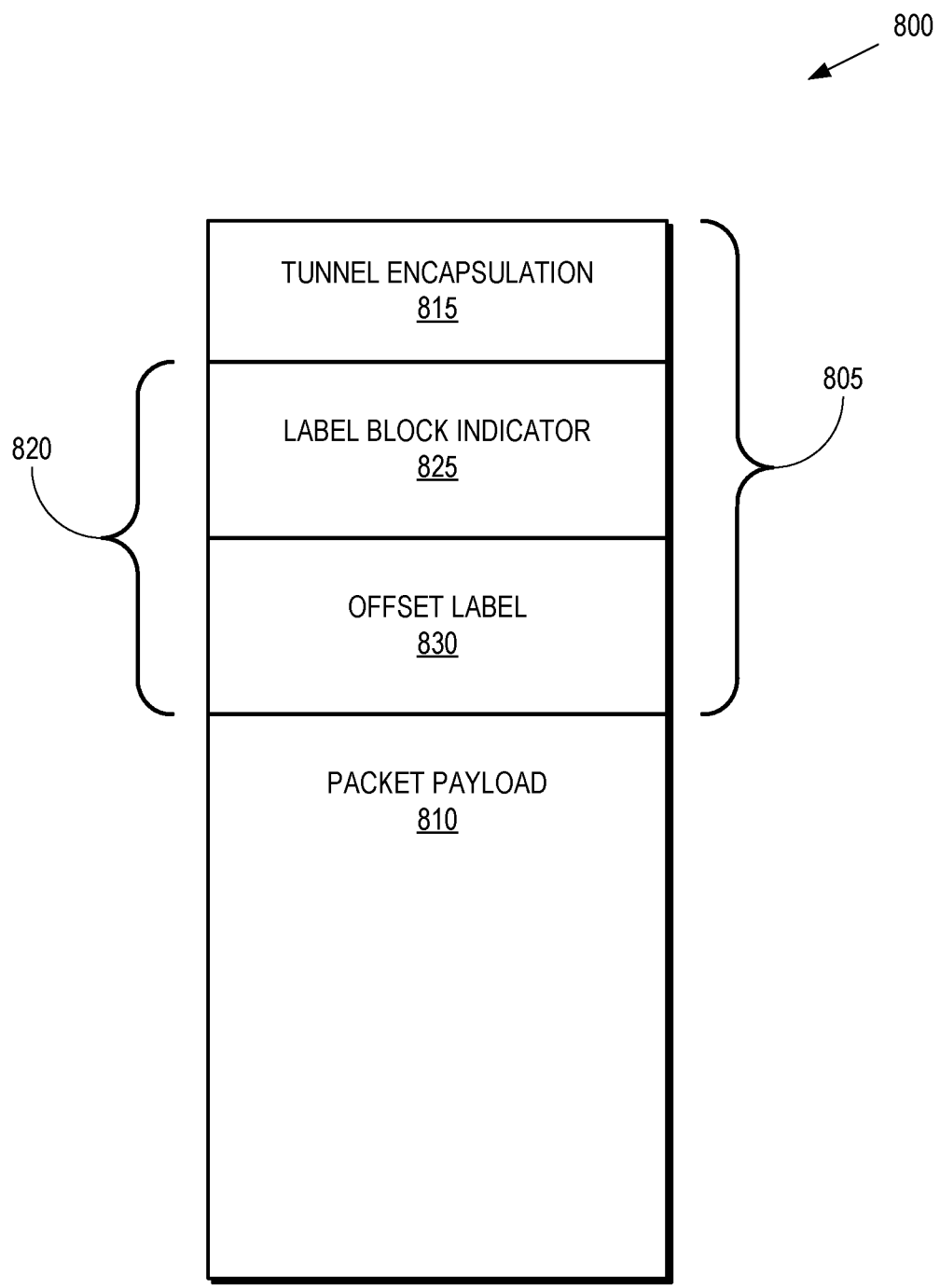
FIG. 8 is a block diagram of a packet that is routed between different VPN site using an MDT that aggregates multiple VPNs according to some embodiments.

FIG. 8 is a block diagram of a packet 800 that is routed between different VPN site using an MDT that aggregates multiple VPNs according to some embodiments. The packet 800 includes a header 805 and a payload 810. The packet 800 includes a tunnel encapsulation 815 that is used to tunnel the packet between PE routers associated with the VPN. For example, the tunnel encapsulation 815 can be used to tunnel a packet between the PE router 111 and the PE router 113 in the communication system 100 shown in FIG. 1. The packet 800 also includes an OLS 820 that corresponds to some embodiments of the OLS 700 shown in FIG. 7. The OLS 820 includes an LBI 825 and an offset label 830 that correspond to some embodiments of the LBI 715 and the offset label 720 shown in FIG. 7.

To support aggregation of multicast packets from multiple MVPNs on a single MDT without upstream assigned label space and UALs, each PE router 110-113 includes VPN specific FTN entries and ILM entries, as shown in tables 14-21 below. The number of FTN entries has been significantly reduced as compared with state-of-art VPN methods because now only one FTN entry is needed per VPN irrespective of the number of remote PE routers 110-113. For example, if there are M sites (and so M numbers of PE routers) for a VPN then instead of M entries in FTN Table for state-of-the-art VPNs, now it requires only 1 entry. So, there is no linear growth of entries in FTN Table as more and more sites are added; growth of FTN table reduced from the order of O(M) to O(1). Typically, M ranges from 50-100. Furthermore, the same OLS is sent to all the egress PE routers in the VPN, so the FEC is the VPN-ID instead of the tuple {VPN-ID, egress PE router}. The PE routers 110-113 also include an FTN Table for the LSPs and MDTs. The ILM entries at the PE routers 110-113 also show the entries for the MPLS LSPs, MDTs terminating at the PE router 110-113 since the ILM Table is common for all labelled packets.

TABLE 14

PE Router 110: FTN Table

| | | NHLFE |
|---|---|---|
| FEC | Next-Hop | Label/OLS |
| ... | ... | ... |
| VPN 120 | Any | {LBI = 0, L1 = 120} |
| ... | ... | ... |
| VPN 130 | Any | {LBI = 0, L1 = 130} |
| ... | ... | ... |

TABLE 15

PE Router 110: ILM Table

| | | NHLFE | |
|---|---|---|---|
| Label | Next-Hop | Next-Hop Label | Context |
| ... | ... | ... | ... |
| 1120 | Self | None | VPN 120 |
| ... | ... | ... | ... |
| 1130 | Self | None | VPN 130 |
| ... | ... | ... | ... |
| LBA_A | Self | None | LSP_BA |
| ... | ... | ... | ... |

TABLE 15-continued

PE Router 110: ILM Table

| Label | NHLFE | | |
|---|---|---|---|
| | Next-Hop | Next-Hop Label | Context |
| LCA_A | Self | None | LSP_CA |
| ... | ... | ... | ... |
| LDA_A | Self | None | LSP_DA |
| ... | ... | ... | ... |
| ML_110_1 | Self | None | LSP {111, MLSP_1} |

TABLE 16

PE Router 111: FTN Table

| FEC | NHLFE | |
|---|---|---|
| | Next-Hop | Label/OLS |
| ... | ... | ... |
| VPN 120 | Any | {LBI = 0, OL = 120} |
| ... | ... | ... |
| VPN 130 | Any | {LBI = 0, OL = 130} |
| ... | ... | ... |

TABLE 17

PE Router 111: ILM Table

| Label | NHLFE | | |
|---|---|---|---|
| | Next-Hop | Next-Hop Label | Context |
| ... | ... | ... | ... |
| 4120 | Self | None | VPN 120 |
| ... | ... | ... | ... |
| 4130 | Self | None | VPN 130 |
| ... | ... | ... | ... |
| LAB_B | Self | None | LSP_AB |
| ... | ... | ... | ... |
| LCB_B | Self | None | LSP_CB |
| ... | ... | ... | ... |
| LDB_B | Self | None | LSP_DB |
| ... | ... | ... | ... |
| ML_111_1 | Self | None | LSP {111, MLSP_1} |

TABLE 18

PE Router 112: FTN Table

| FEC | NHLFE | |
|---|---|---|
| | Next-Hop | Label/OLS |
| ... | ... | ... |
| VPN 120 | Any | {LBI = 0, OL = 120} |
| ... | ... | ... |
| VPN 130 | Any | {LBI = 0, OL = 130} |
| ... | ... | ... |

TABLE 19

PE Router 112: ILM Table

| Label | NHLFE | | |
|---|---|---|---|
| | Next-Hop | Next-Hop Label | Context |
| ... | ... | ... | ... |
| 6120 | Self | None | VPN 120 |
| ... | ... | ... | ... |
| 6130 | Self | None | VPN 130 |
| ... | ... | ... | ... |
| LAC_C | Self | None | LSP_AC |
| ... | ... | ... | ... |
| LBC_C | Self | None | LSP_BC |
| ... | ... | ... | ... |
| LDC_C | Self | None | LSP_DC |
| ... | ... | ... | ... |
| ML_112_1 | Self | None | LSP {111, MLSP_1} |

TABLE 20

PE Router 113: FTN Table

| FEC | NHLFE | |
|---|---|---|
| | Next-Hop | Label/OLS |
| ... | ... | ... |
| VPN 120 | Any | {LBI = 0, OL = 120} |
| ... | ... | ... |
| VPN 130 | Any | {LBI = 0, OL = 130} |
| ... | ... | ... |

TABLE 21

PE Router 113: ILM Table

| Label | NHLFE | | |
|---|---|---|---|
| | Next-Hop | Next-Hop Label | Context |
| ... | ... | ... | ... |
| 8120 | Self | None | VPN 120 |
| ... | ... | ... | ... |
| 8130 | Self | None | VPN 130 |
| ... | ... | ... | ... |
| LAD_D | Self | None | LSP_AD |
| ... | ... | ... | ... |
| LBD_D | Self | None | LSP_BD |
| ... | ... | ... | ... |
| LCD_D | Self | None | LSP_CD |
| ... | ... | ... | ... |
| ML_113_1 | Self | None | LSP {111, MLSP_1} |

In some embodiments, packets are unicast using the aggregated VPN MDT 600 shown in FIG. 6. For example, if packets P1 and P2 associated with the VPNs 120, 130, respectively, are unicast, the PE router 111 forwards both packets via the same aggregated VPN MDT. The PE router 111 associates the packet P1 to VPN 120 since the access link 142 on which P1 is received is assigned to VPN 120. Then PE 111 looks up the forwarding table for VPN 120 to make forwarding decision for P1 based on its destination address, e.g., the PE router 111 decides to unicast P1 to PE router 112, which is the next-hop for the packet P1 in the VPN 120. The PE router 111 looks up the FTN Table (table 21 above) entry for VPN 120, which is programmed with OLS={LBI=0, LI=120}. The PE router 111 pushes LI 120 as the OL onto the packet P1. In the illustrated embodiment, the LBI is 0, so it is not encoded in the packet P1. Further, the PE router 111 decides to tunnel the labelled packet to PE router 112 via LSP_BC, so the PE router 111 pushes label LBC_E to send the packet P1 to the LSP's next-hop router 101. The resultant packet {LBC_E, OL=120, P1} is finally sent to router 101.

In response to receiving the packet P1, the router 101 swaps the LSP label LBC_E with LBC_G towards the router 103 and the resultant packet {LBC_G, OL=120, P1} is sent to the router 103. In response to receiving the packet P1, the router 103 swaps the LSP label LBC_G with LBC_C towards the PE router 112 and the resultant packet {LBC_C, OL=120, P1} is sent to the PE router 112. In response to receiving the packet P1, the PE router 112 looks up the topmost label LBC_C in ILM Table (table 24 above). Since the state of the label LBC_C in the PE router 112 indicates termination of the LSP_BC, the PE router 112 pops the label and then finds the next label as OL=120. The PE router 112 first finds the LB configured with LBI 0 and then gets the start label of the LB as 6000. The PE router 112 computes the actual label as 6000+120=6120 and looks up the label 6120 in ILM Table (table 24 above), which maps to VPN 120, so the OL=120 is popped as well. The PE router 112 then looks up the destination address of the resultant packet P1 in the forwarding table for VPN 120, which results in forwarding to CE router 123. Other unicast packets for VPN 120 that are sent from any PE router to any PE router would be encoded with same OL=120.

When the packet P2 is received by PE 111, the packet P2 is associated with VPN 130 since the access link 152 on which P2 is received is assigned to VPN 130. Then PE router 111 looks up the forwarding table for VPN 130 to make forwarding decision for the packet P2 based on its destination address. Based on the lookup, the PE router 111 decides to unicast the packet P2 to the PE router 112, which is the next-hop for the packet P2 in the VPN 130. The PE router 111 looks up the FTN Table (table 21 above) entry for VPN 130 which is programmed with OLS={LBI=0, LI=130}. The PE router 111 pushes LI 130 as OL onto the packet P2. The LBI is 0 and is therefore not encoded in the packet P2. Further, PE router 111 decides to tunnel the labelled packet to the PE router 112 via LSP_BC, so the PE router 111 pushes label LBC_E to send the packet P2 to the LSP's next-hop router 101. The resultant packet {LBC_E, OL=130, P2} is sent to router 101.

In response to receiving the packet P2, the router 101 swaps the LSP label LBC_E with LBC_G towards the router 103 and the resultant packet {LBC_G, OL=130, P2} is sent to the router 103. In response to receiving the packet P2, the router 103 swaps the LSP label LBC_G with LBC_C towards the PE router 112 and the resultant packet {LBC_C, OL=130, P2} is sent to the PE router 112. In response to receiving the packet P2, the PE router 112 looks up the topmost label LBC_C in ILM Table (table 24 above). Since the state of the label LBC_C in the PE router 112 indicates termination LSP_BC, so the PE router 112 pops the label and finds the next label as OL=130. The PE router 112 first finds the LB configured with LBI 0 and then gets the start label of the LB as 6000. 112 computes the actual label as 6000+130=6130. The PE router 112 looks up the label 6130 in ILM Table (table 24 above), which maps to VPN 130, so the OL=130 is popped as well. The PE router 112 then looks up the destination address of the resultant packet P2 in the forwarding table for VPN 130, which results in forwarding to CE router 133.

In some embodiments, packets are multicast using the aggregated VPN MDT 600 shown in FIG. 6. For example, if the packets P5 and P6 are multicast in the VPNs 120, 130, the PE router 111 routes the packets P5 and P6 using the same aggregate VPN MDT, as follows.

The CE router 121 forwards a packet P5 to PE router 111 over the access link 142. In response to receiving the packet P5, the PE router 111 associates the packet with VPN 120. The PE router 111 looks up the forwarding table of VPN 120, which results in multicast of the packet to egress PE routers 110, 112, 113. The PE router 111 looks up the FTN Table (table 21 above) entry for VPN 120 which is programmed with OLS={LBI=0, LI=120}. The PE router 111 pushes LI 120 as OL onto the packet P5. In the illustrated embodiment, the LBI is 0 and therefore is not encoded in the packet P5. The PE router 111 decides to multicast the packet using P2MP LSP {111, MLSP_1} that bears the PE routers 110, 112, 113 as egress routers. The PE router 111 pushes the P2MP LSP label ML_101, and sends the resultant packet {ML_101, OL=120, P5} to router 101.

On receipt of the packet P5, the router 101 looks up the outermost label ML_101_1 in its ILM which results in replicating the packet into following two copies:

Copy 1: The outermost label ML_101_1 is swapped with label ML_110_1. The resultant packet {ML_110_1, OL=120, P5} is sent to branch next-hop PE router 110.

Copy 2: The outermost label ML_101_1 is swapped with label ML_103_1 and the resultant packet {ML_103_1, OL=120, P5} is sent to branch next-hop router 103.

In response to receiving the first copy, the PE router 110 looks up the outermost label ML_110_1 in its ILM Table (table 20 above). The ILM entry indicates that the PE router 110 is the egress router for the P2MP LSP {111, MLSP_1}. The PE router 110 pops label ML_110_1 and finds OL=120 underneath. The PE router 110 first finds the LB configured with LBI 0 and then gets the start label of the LB as 1000. The PE router 110 computes the actual label as 1000+120=1120 and looks up the label 1120 in its ILM Table (table 20) which maps the label to VPN 120, so the PE router 110 pops OL 120. The PE router 110 then forwards the packet P5 to CE router 122 by looking up the forwarding table of VPN 120.

In response to receiving the second copy, the router 103 looks up the outermost label ML_103_1 in its ILM which results in replicating the packet into following two copies:

Copy 3: The outermost label ML_103_1 is swapped with label ML_112_1 and the resultant packet {ML_112_1, OL=120, P5} is sent to branch next-hop PE router 112.

Copy 4: The outermost label ML_103_1 is swapped with label ML_113_1 and the resultant packet {ML_113_1, OL=120, P5} is sent to branch next-hop PE router 113.

In response to receiving the third copy, the PE router 112 looks up the outermost label ML_112_1 in its ILM Table (see table 19 above). The ILM entry indicates that it is the egress router for the P2MP LSP {111, MLSP_1}. So, it pops label ML_112_1 and finds OL=120 underneath. So, it first finds the LB configured with LBI 0 and then gets the start label of the LB as 6000. It computes the actual label as 6000+120=6120. The PE router 112 looks up the label 6120 in its ILM Table (see table 19 above), which maps the label to VPN 120. The PE router 112 pops OL 120. The PE router 112 then forwards the resultant packet P5 to CE router 123 by looking up the forwarding table of VPN 120.

In response to receiving the fourth copy, the PE router 113 looks up the outermost label ML_113_1 in its ILM Table (table 21 above). The ILM entry indicates that the PE router 113 is the egress router for the P2MP LSP {111, MLSP_1}. The PE router 113 pops label ML_113_1 and finds OL=120 underneath. The PE router 113 first finds the LB configured with LBI 0 and then gets the start label of the LB as 8000.

The PE router 113 computes the actual label as 8000+ 120=8120. The PE router 113 looks up the label 8120 in its ILM Table (table 21 above), which maps the label to VPN 120. The PE router 113 pops OL 120 and then forwards the resultant packet P5 to CE router 124 by looking up the forwarding table of VPN 120.

The CE router 131 forwards a packet P6 to PE router 111 over the access link 152. In response to receiving the packet P6, the PE router 111 associates the packet with VPN 130. The PE router 111 looks up the forwarding table of VPN 130 which results in multicast of the packet P6 to PE routers 110, 112, 113. The PE router 111 decides to multicast the packet using P2MP LSP {111, MLSP_1} that bears the respective PE routers 110, 112, 113 as leaves of the MDT. The PE router 111 pushes the OL=130 assigned to VPN 130 and then pushes the P2MP LSP label ML_101. The PE router 111 sends the resultant P6 packet {ML_101, OL=130, P6} to router 101. This packet is forwarded along the P2MP LSP and processed by leaf routers in a similar fashion described above for packet P5.

In summary, the following concepts are disclosed herein:
a network wide unique Label Block identified by a Label Block Identifier, wherein the Label Block comprises of a set of contiguous labels. A Label Block is mapped to arbitrary ranges in local label spaces of a set of routers.
assigning a label (from local label space) by a router to an MPLS FEC as an index in a Label Block, wherein the label is represented by the tuple {Label Block Identifier, Label Index}.
advertising a label mapping for a FEC in control plane/ protocol messages, wherein the label is encoded as a tuple {Label Block Identifier, Label Index}.
encoding an Offset Label Stack (OLS) or the likes in a MPLS packet that carries {Label Block Identifier, Label Block Index} as the indication of the label to be looked up in the receiving LSR/router.

Some embodiments of the VPN architecture disclosed herein include the features:
A VPN is assigned a network wide unique tuple {Label Block Identifier, Label Index}. At each PE router of the VPN, the tuple maps to a label in its local label space, wherein the label is the demultiplexer of the VPN (i.e VPN-Label) packets received from a remote PE router.
A VPN advertisement by a PE router to all remote PE routers of the VPN (using control plane/protocols among PE routers) include the assigned tuple {Label Block Identifier, Label Index} as an indication of its local VPN-Label.
Both unicast and multicast packets for a VPN exchanged among PE routers encode the network wide unique {Label Block Identifier, Label Index} as OLS in the packets, wherein the OLS is the indication of the VPN-Label in the local label space of the receiving PE router. This enables simplified N:1 aggregation of multicast packets from multiple VPNs on a single MDT, without using upstream assigned labels and upstream assigned label space.

Encoding of Offset Label Stack (OLS) in MPLS Packet

Some embodiments of the offset label are encoded in an MPLS packet in the context of a parent LBI. In that case, the {<LBI>, OL} are encoded as a tuple of MPLS labels that is referred to as an "Offset Label Stack" (OLS). However, encoding of LBI is OPTIONAL in OLS, because if LBI is 0 then the LBI is not encoded into the packet. Allowing for the optional encoding of the LBI in an OLS conserves a label in the OLS packet when LBI is 0 (or other default value). If a receiver of an OLS in MPLS packet does not find LBI within OLS then it derives the LBI as 0 (or other default value).

When the OLS is embedded in MPLS label stack consisting of "other" labels, a receiving router distinguishes unambiguously between OLS and other labels. For example, in the case of tunneled VPN packets, OLS is preceded by the label of the unicast LSP tunnel or a MP LSP tunnel. To distinguish an OLS, the label immediately preceding an OLS is an "Offset Label Stack Indicator (OLSI)", where preceding means closer to the top of the label stack (farther from bottom of stack indication). The OLSI is a special label that is not used for any other purposes. An EXP field in the OLSI is set to 0 as those have no significance. An S bit is set to 0 since further labels always follow the OLSI. The 8-bits TTL field in OLSI are defined as "Flags" field that indicates various conditions of the OLS. This following bit definitions are used in the Flags field:

B-bit: If this bit is set to 1 then it means the label immediately following the OLSI is LBI, otherwise it is OL.

The LBI is encoded as any other regular MPLS label, wherein the LBI value is encoded in the 20-bits label value field. EXP and TTL fields in LBI must be set to 0 as those has no significance. S bit MUST be set to 0 since OL always follow the LBI.

The OL is encoded as any other regular MPLS label, wherein the OL value field is encode in the 20-bits label value field. EXP and TTL fields in OL must be set to 0 as those has no significance. If there are more labels after OLS then S-bit is set to 0, otherwise S-bit is set to 1.

FIG. 22 is an example encoding 2200 of the {OLSI, OLS} in a MPLS packet.

FIG. 23 is another example encoding 2300 of the {OLSI, OLS} in a MPLS packet.

In the example encoding 2300, the {LBI, OL} is encoded in one MPLS label, thus reducing an extra label as needed in the format above. The 20-bit field of an MPLS label is segregated to encode the LBI and OL. In the example encoding above, 8 bits are assigned to LBI and remaining 12 bits are assigned to LBI. Thus, a total 256 Label Blocks are possible with each Label Block containing up to 4096 Labels. Some embodiments of the encoding segregate the number of bits for LBI and OL.

Figure 9:
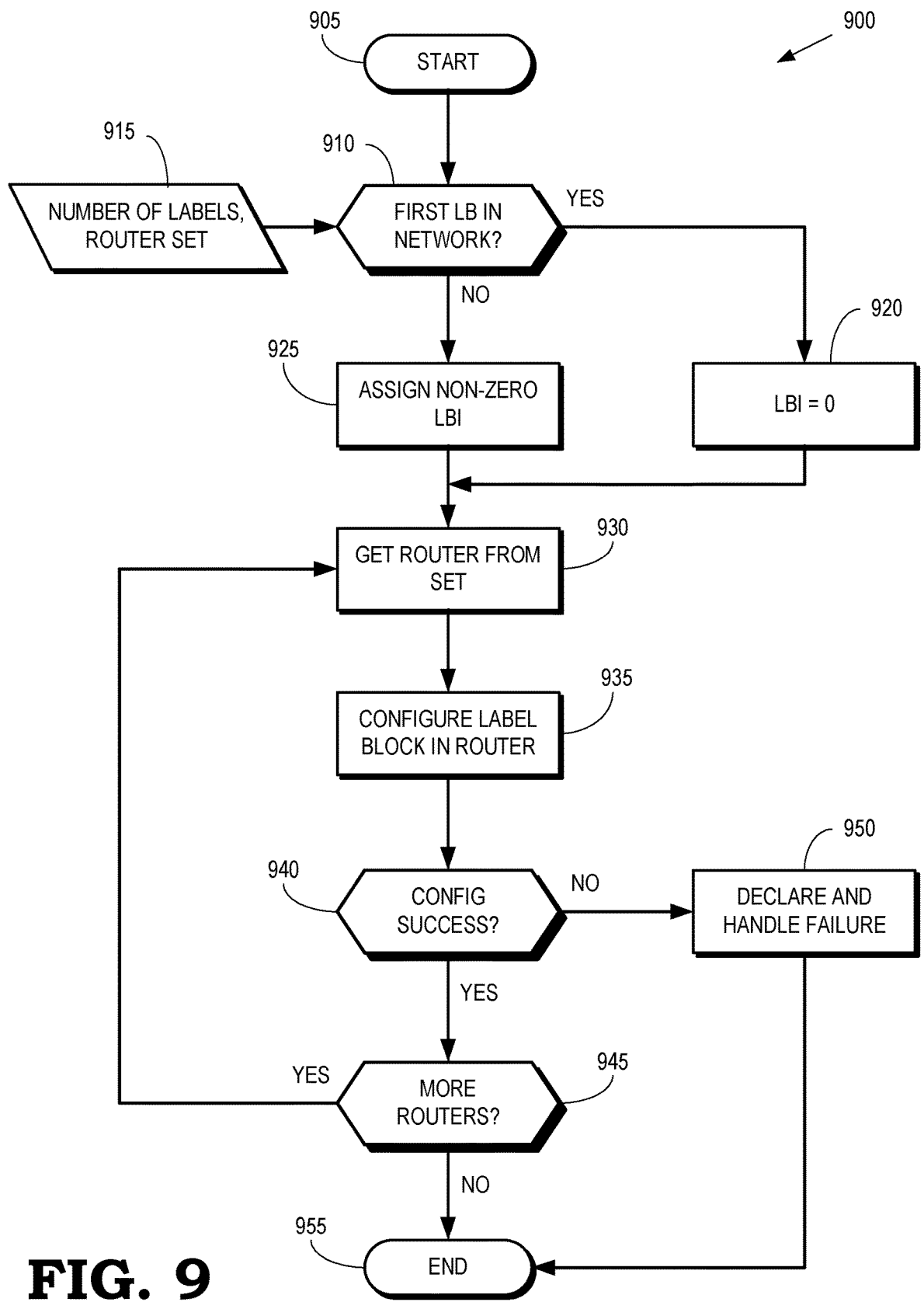
FIG. 9 is a flow diagram of a method for allocating a label block to routers in a processing system according to some embodiments.

FIG. 9 is a flow diagram of a method 900 for allocating a label block to routers in a processing system according to some embodiments. The method 900 is implemented in some embodiments of the communication system 100 shown in FIG. 1. The label block is configured across all routers that participate in the label block in response to allocation of the label block with an LBI for an application. For example, a VPN Label Block allocated with a VPN-LBI is configured across all potential PE routers of the VPN. In some embodiments, label blocks are managed by a centralized SDN (Software Defined Networking) controller, which manages the allocation of a new label block with a network wide unique LBI and configuration of the label block at each participating router. Otherwise, if the label blocks are managed manually then each label block is assigned a network wide unique LBI and the label block is configured manually in each of the participating routers.

The method 900 receives input information 915 including a number (NL) of contiguous labels in the label block and the set of routers to be configured with the label block. The method 900 starts at the block 905 and flows to the decision block 910. At the decision block 910, the system determines whether this is the first label block in the network. In the illustrated embodiment, the decision block 910 makes the decision using its Label Blocks Database. If the database is empty then this is the first LB that is being created. If this is the first label block, the method 900 flows to the block 920 and the LBI is set to 0 (or other default value). If this is not the first label block, the method 900 flows to the block 925 and a unique non-zero LBI value (or a value that differs from the default value) is assigned to the LBI. The method 900 then flows to block 930.

At block 930, a first router is selected from the router set. At block 935, the label block {LBI, NL=number of labels} is configured in the local label space of the router. At decision block 940, the router determines whether the configuration is successful. If so, the method 900 flows to decision block 945. If the configuration is unsuccessful, the method 900 flows to block 950, which declares and handles the failure or fault condition. In some embodiments, handling the failure includes rollback of already performed configs at other routers for the LB, releasing of LBI back to the label blocks database, or other operations. After the failure has been handled, the method 900 ends at the block 955.

At decision block 945, the system determines whether there are any additional routers to be configured. If so, the method 900 flows back to block 930 and another router is selected from the router set. If no additional routers need to be configured, the method 900 flows to block 955 and the method 900 ends.

Configuration of a Label Block at a Router

The PE routers that participate in a VPN reserve one or more blocks of labels in its local label space for allocation of VPN labels. A label block is configured in the local label space of a router with the tuple {LBI, Start Label, Number of Labels in the block}. In some embodiments, a router also employs the techniques disclosed herein for applications other than VPN, so label blocks are allocated for non-VPN application as well. A router may take various approaches on distribution of label blocks. For example, a router can employ label blocks only for VPN, in which case the router is a PE router. The router may reserve a single label block of size N to accommodate N max number of VPNs. In that case, the label block is termed as "default Label Block" which is given the LBI value 0 and means the one and only label block supported by the PE router.

In some embodiments, reserving an entire block of N labels is sub-optimal. Instead, the router allocates new label blocks in quanta of labels based on demand. In that case, a PE router reserves a smaller sized initial label block (i.e size «N) with LBI value 0. In response to the label block being exhausted, the router allocates a new label block and so on. Each subsequent label block is assigned a unique non-zero LBI. Some embodiments of a PE router segregate label blocks based on type of VPNs. For example, IP-VPNs and EVPNs may be assigned disjoint set of label blocks. The block of labels could be in any arbitrary range (i.e., arbitrary Start Label) in the local label space of a router.

Figure 10:
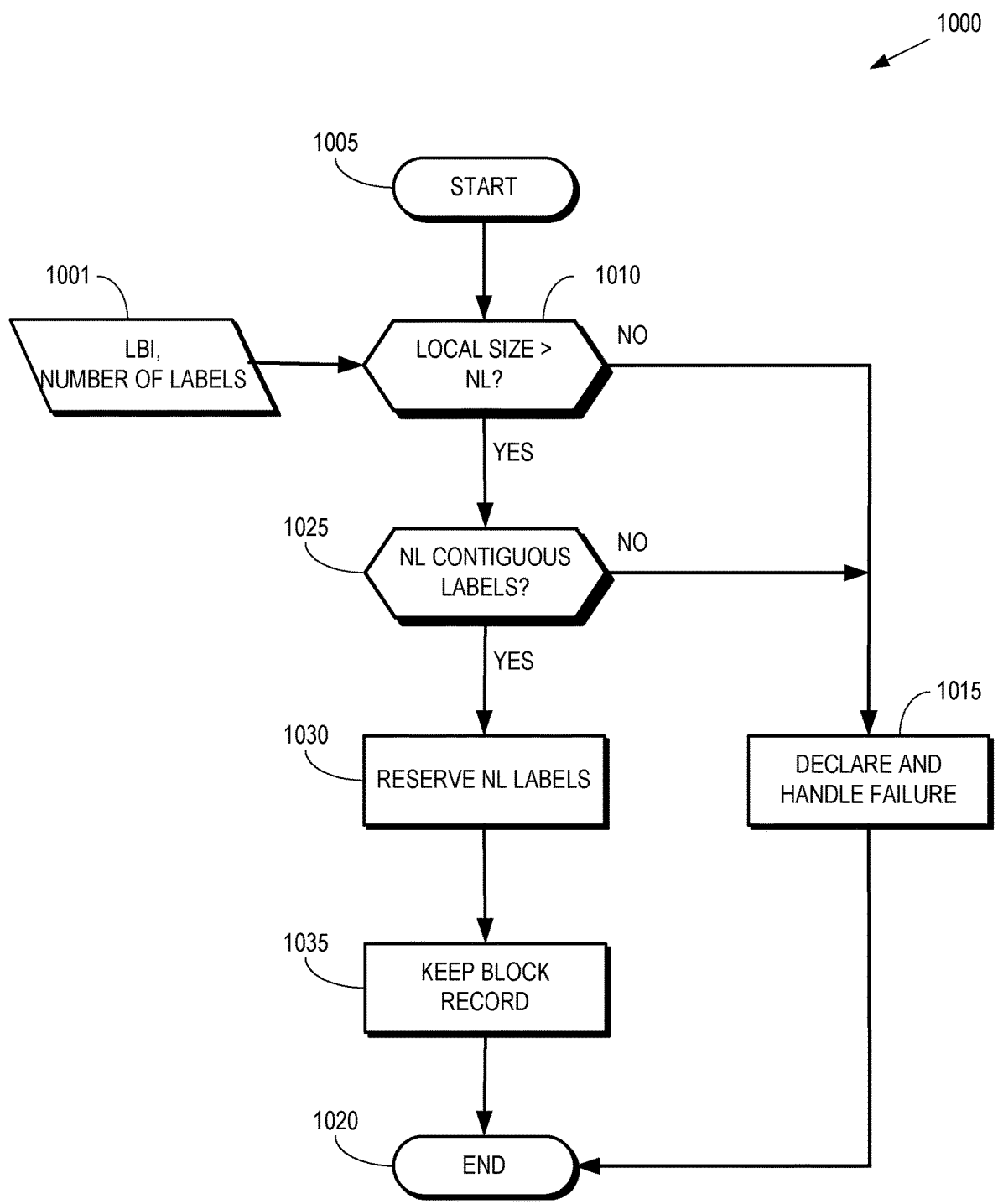
FIG. 10 is a flow diagram of a method of configuring a label block in a router according to some embodiments.

FIG. 10 is a flow diagram of a method 1000 of configuring a label block in a router according to some embodiments. The method 1000 is implemented in some embodiments of the communication system 100 shown in FIG. 1. Some embodiments of the method 1000 implement the block 935 in FIG. 9. The router receives input information 1001 including an LBI and a number (NL) of contiguous labels in the block. In some embodiments, the input information is received in a request to reserve the block of contiguous labels.

The method 1000 starts at the block 1005 and flows to the decision block 1010. At the decision block 1010, the router determines whether the size of the local label space is larger than the requested number of contiguous labels in the block. If not, the local label space of the router does not have sufficient space to allocate the requested number of contiguous labels and the method 1000 flows to block 1015. The router declares and handles the failure condition at block 1015 and the method 1000 ends at block 1020. If the size of the local label space is larger than the requested number of contiguous labels, the method 1000 flows to decision block 1025.

At decision block 1025, the router determines whether the local label space includes a block of contiguous and unallocated labels of the requested size. If so, the method 1000 flows to block 1030. If not, the method 1000 flows to block 1015, the router declares and handles the failure condition at block 1020, and the method 1000 ends at block 1020.

At block 1030, the router reserves the block of contiguous labels. The router reserves and allocates the block of contiguous labels using algorithms such as first-fit, best-fit, and the like. At block 1035, the router generates and stores a record of the block as {LBI, Start Label, NL}. The method 1000 then ends at block 1020.

Figure 11:
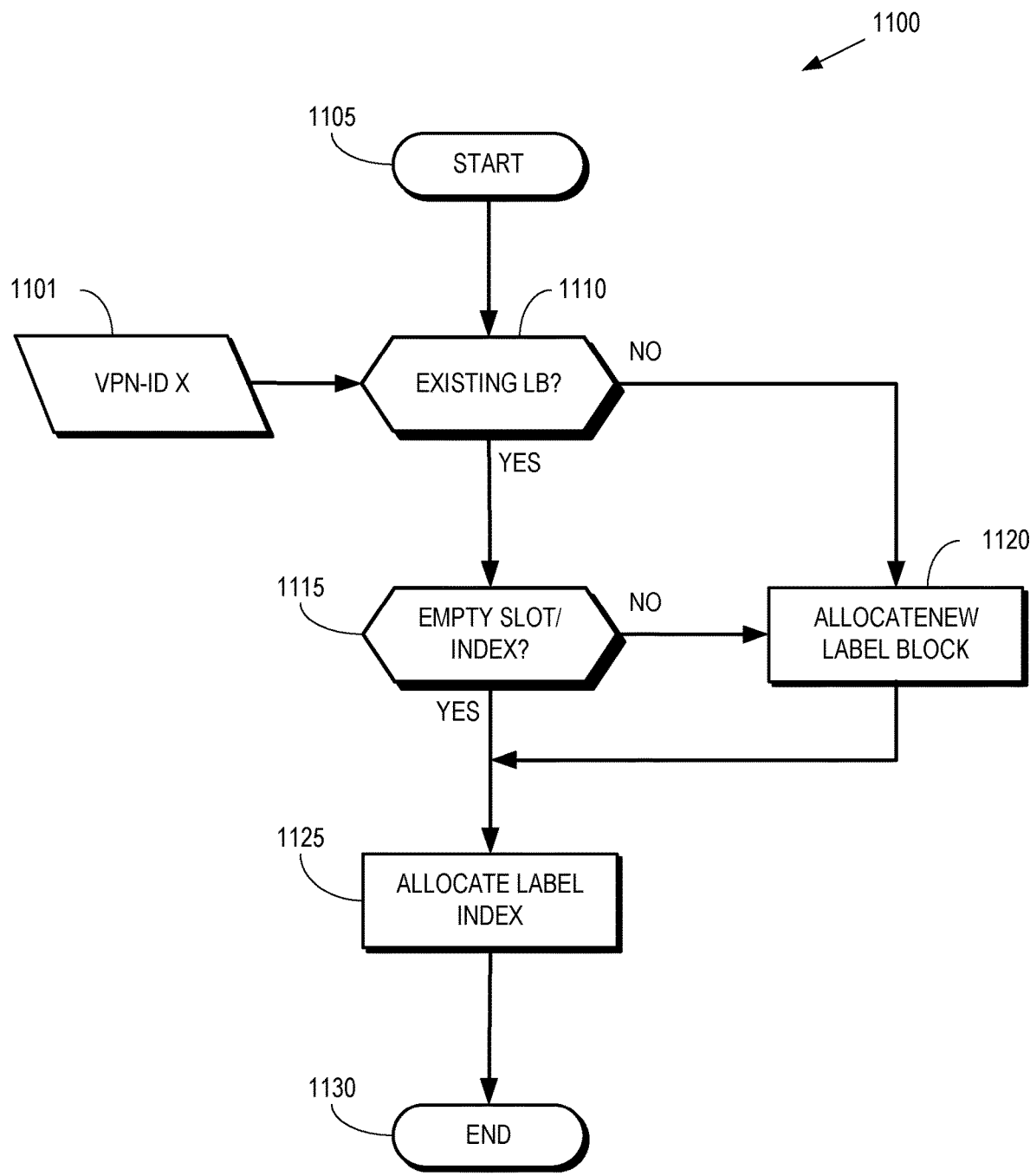
FIG. 11 is a flow diagram of a method of allocating a label block index (LBI) and a label index (LI) for a VPN according to some embodiments.

FIG. 11 is a flow diagram of a method 1100 of allocating an LBI and an LI for a VPN according to some embodiments. The method 1100 is implemented in some embodiments of the communication system 100 shown in FIG. 1.

Configuration of a VPN for a network, the VPN includes allocating a network wide unique {VPN-LBI, VPN-LI} for the VPN. Allocation of the network wide unique identifiers is performed using input information 1101 including an identifier of the VPN (e.g., a VPN-ID X) for which {VPN-LBI, VPN-LI} is to be allocated. If the VPNs are managed by a centralized SDN (Software Defined Networking) controller, the controller manages the network wide unique allocation {VPN-LBI, VPN-LI} according to some embodiments of the method 1100. Otherwise, if the VPN is configured manually at each PE router then each PE router is configured (according to some embodiments of the method 1100) with the same {VPN-LBI, VPN-LI} values, which have not been allocated to another VPN.

The method 1100 starts at block 1105. At decision block 1110, the system determines whether there is an existing label block that is available for use by the VPN. In some embodiments, a label blocks database is accessed to determine whether an existing label block is available for allocation to the VPN, e.g., using the label block distribution criteria disclosed herein. If so, the method 1100 flows to block 1115. If not, the method 1100 flows to decision block 1120.

At block 1120, a new label block of NL contiguous labels is allocated and associated with an LBI such as VPN LBI B. At decision block 1115, the system determines whether there is an empty slot (as indicated by label index) available in VPN LBI B. If no available slots are found, indicating that all the labels in the label block have been allocated to applications such as VPN and the like, the method 1100 flows to block 1120 and a new label block is allocated. If an available slot is found, the method 1100 flows to block 1125.

At block 1125, a label index is allocated from the available slots. For example, the label index VPN-LI I is allocated from VPN-LBI B. The method 1100 then flows to block 1130 and the method 1100 ends.

Figure 12:
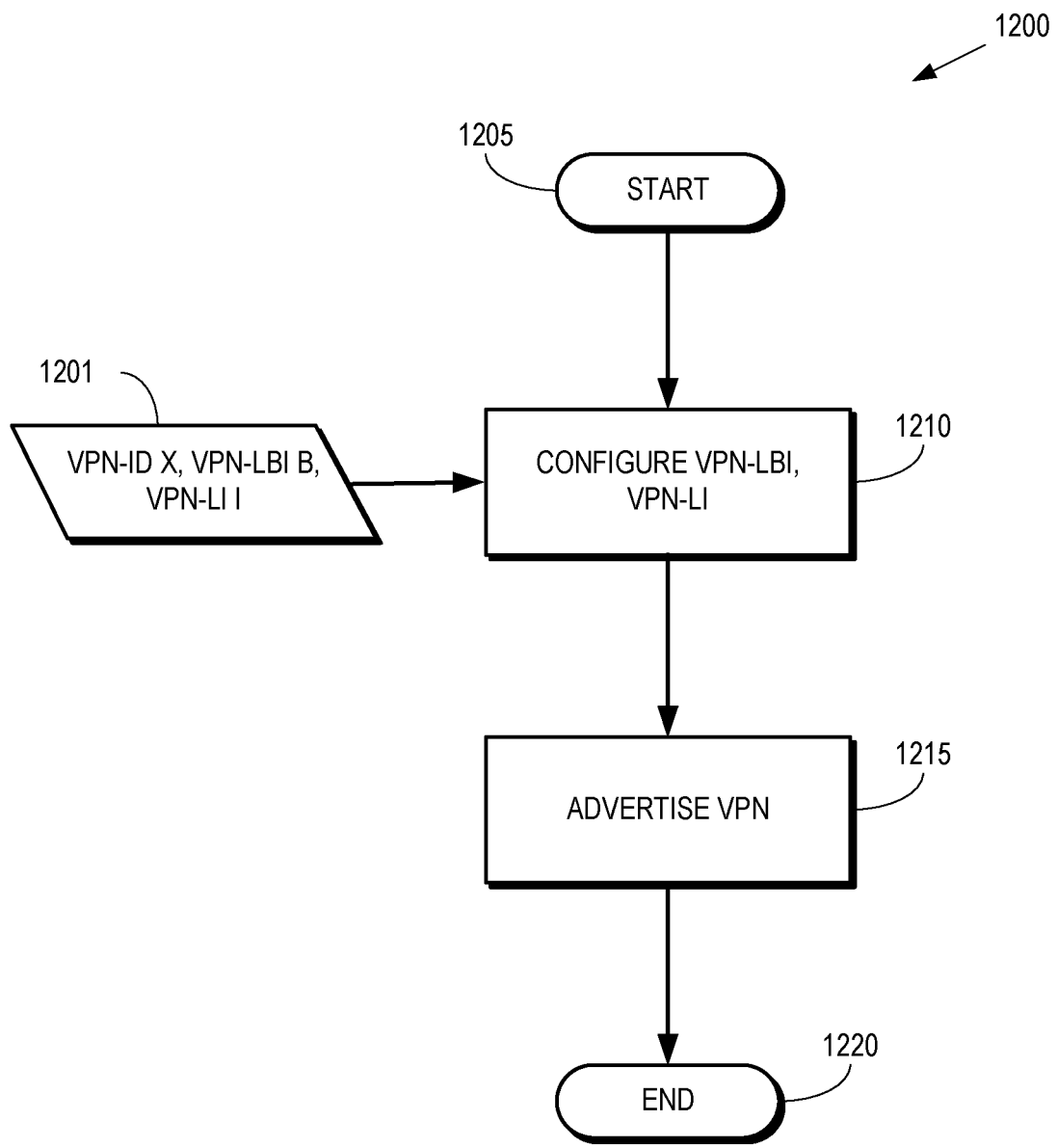
FIG. 12 is a flow diagram of a method of configuring a VPN at a PE router according to some embodiments.

FIG. 12 is a flow diagram of a method 1200 of configuring a VPN at a PE router according to some embodiments. The method 1200 is implemented in some embodiments of the PE routers 110-113 in the communication system 100 shown in FIG. 1. In the illustrated embodiment, the method 1200 operates on input 1201 that includes the tuple {VPN-ID, VPN-LBI, VPN-LI}.

The method 1200 begins at block 1205. At block 1210, the PE router configures the {VPN-LBI, VPN-LI} for the VPN-ID. The method 1200 proceeds to block 1215 and the PE router advertises the configured {VPN-LBI, VPN-LI} to all remote PE routers. The method 1200 then ends at block 1220.

Figure 13:
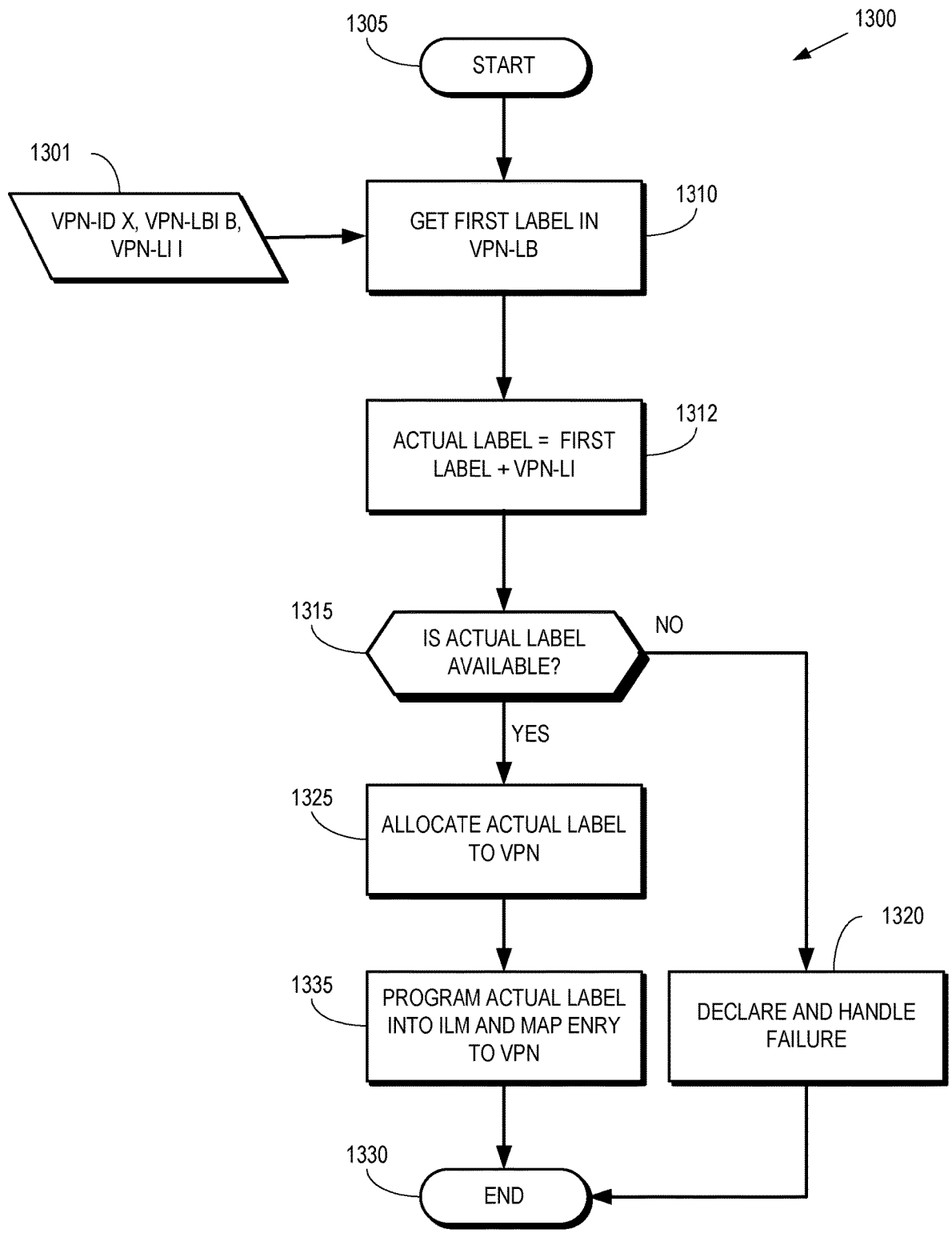
FIG. 13 is a flow diagram of a method of configuring the tuple {VPN-LBI, VPN-LI} for the VPN-ID at a PE router according to some embodiments.

FIG. 13 is a flow diagram of a method 1300 of configuring the {VPN-LBI, VPN-LI} for the VPN-ID at a PE router according to some embodiments. The method 1300 is implemented in some embodiments of the PE routers 110-113 in the communication system 100 shown in FIG. 1. When a VPN is configured with a {VPN-LBI, VPN-LI} then the following VPN-Label is assigned to the VPN from the local label space of the PE Router:

VPN-Label=Starting Label of the LB indexed by VPN-LBI+VPN-LI.

The VPN label is programmed in the ILM Table of the PE router, such that the ILM entry maps to the context of the VPN. The method 1300 performs this operation and is used to implement some embodiments of the block 1210 shown in FIG. 12.

In the illustrated embodiment, the method 1300 operates on input 1301 that includes the tuple {VPN-ID, VPN-LBI, VPN-LI}. The method 1300 begins at block 1305.

At block 1310, the PE router looks up a local configuration of the label block for the VPN-LBI and obtains a start label of the label block. At block 1312, the actual label is set equal to the start label plus the VPN-LI. At decision block 1315, the PE router determines whether the actual label is available, which indicates that the actual label is not allocated to another VPN or any other application. If the actual label is not available, the method 1300 flows to block 1320. If the actual label is available, the method 1300 flows to block 1325.

At block 1320, the method 1300 declares and handles the failure to configure the VPN. The method 1300 flows to block 1330 and the method 1300 ends.

At block 1325, the PE router allocates the label as the VPN-label for the VPN-ID. For example, the PE router allocates the actual label as the VPN-Label. At block 1335, the actual label is programmed into the ILM Table of the PE router so that the ILM entry maps to the context of the VPN-ID. The method 1300 flows to block 1330 and the method 1300 ends.

Figure 14:
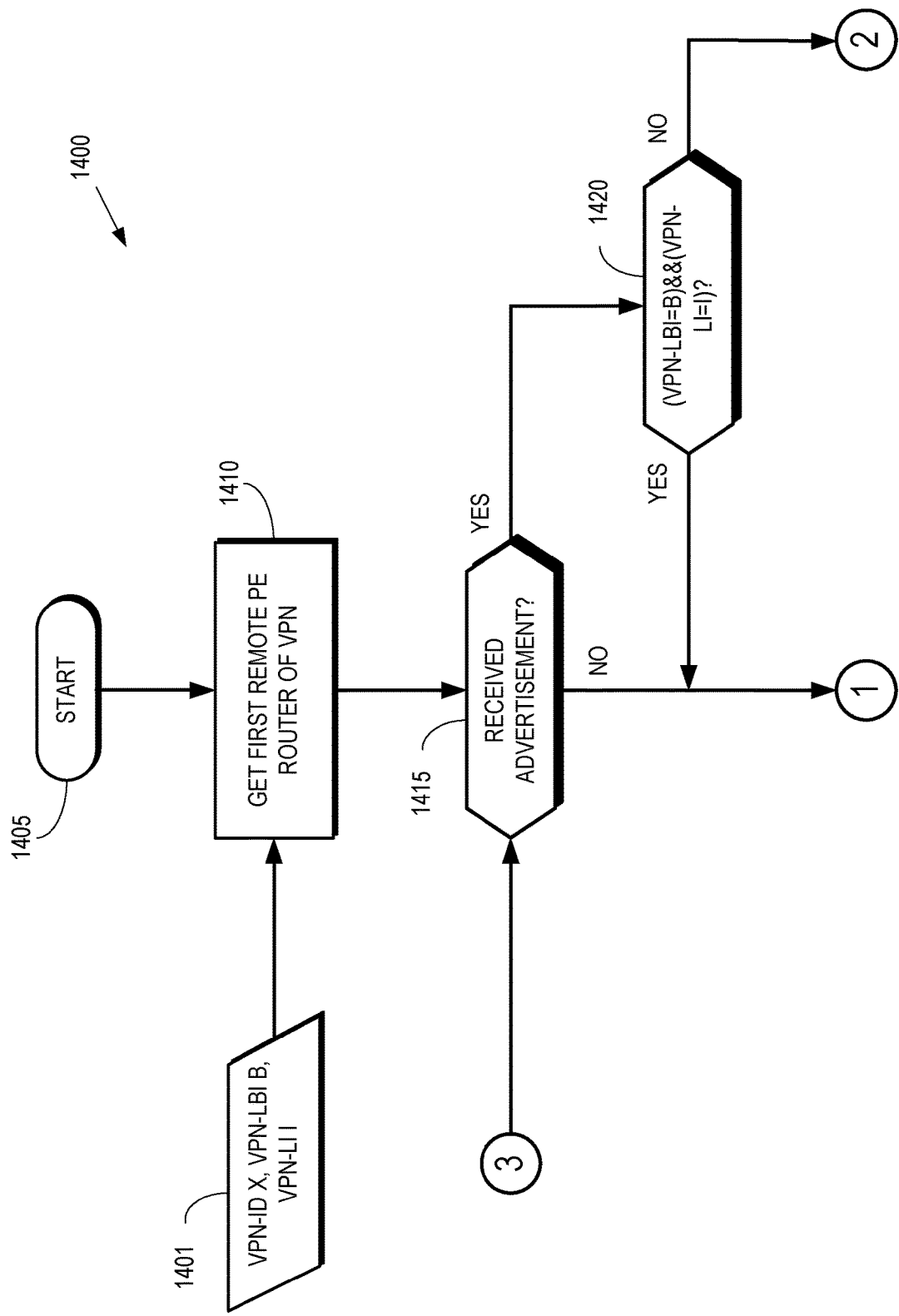
FIG. 14 is a flow diagram of a first portion of a method of advertising the tuple {VPN-LBI, VPN-LI} for the VPN-ID from a PE router according to some embodiments.

FIG. 14 is a flow diagram of a first portion of a method 1400 of advertising the {VPN-LBI, VPN-LI} for the VPN-ID from a PE router according to some embodiments. The method 1400 is implemented in some embodiments of the PE routers 110-113 in the communication system 100 shown in FIG. 1. When a VPN is dynamically provisioned by a signalling protocol (e.g., BGP for IP-VPN, EVPN etc) then a PE router advertises the mapping of its VPN-ID to {VPN-LBI, VPN-LI} to the remote PE routers of the VPN. The method 1400 performs this operation and is used to implement some embodiments of the block 1215 shown in FIG. 12.

In the illustrated embodiment, the method 1400 operates on input 1401 that includes the tuple {VPN-ID, VPN-LBI, VPN-LI}. The method 1400 begins at block 1405. At block 1410, the first remote PE router is identified. At decision block 1415, the PE router determines whether an advertisement for the VPN-ID has already been received from the remote PE router. If an advertisement has been received, the method 1400 flows to decision block 1420. If no advertisement has been received, the method 1400 flows to the node 1 (see discussion regarding FIG. 15 below). At decision block 1420, the PE router compares the tuple {VPN-LBI, VPN-LI} advertised by the remote PE router to the input tuple {VPN-LBI, VPN-LI}. If the input tuple is the same as the advertised tuple, the method 1400 flows to the node 1 (see discussion regarding FIG. 15 below). If the input tuple is different than the advertised tuple, the method 1400 flows to the node 2 (see discussion regarding FIG. 15 below).

Figure 15:
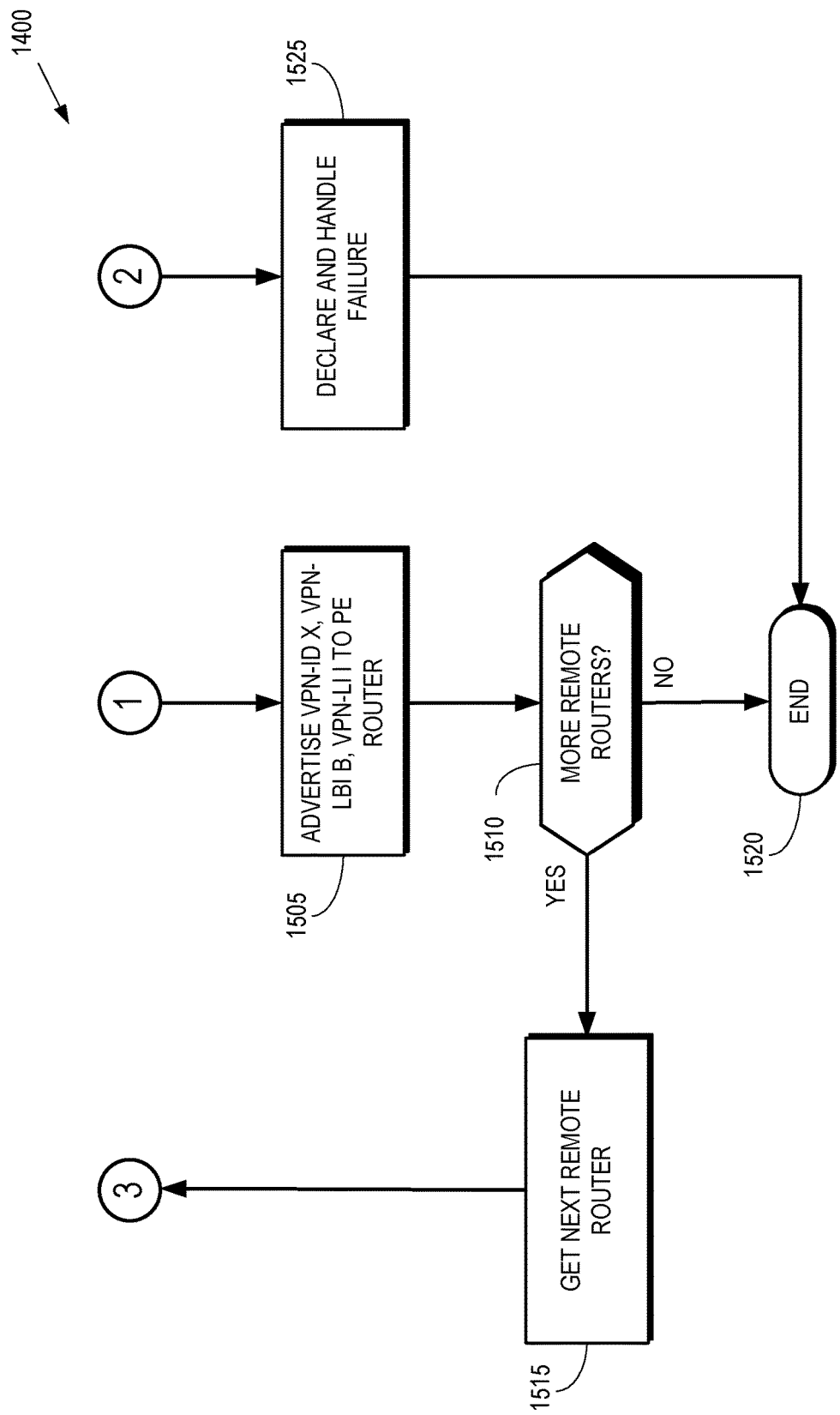
FIG. 15 is a flow diagram of a second portion of the method of advertising the tuple {VPN-LBI, VPN-LI} for the VPN-ID from a PE router according to some embodiments.

FIG. 15 is a flow diagram of a second portion of the method 1400 of advertising the {VPN-LBI, VPN-LI} for the VPN-ID from a PE router according to some embodiments.

The method 1400 flows from the node 1 to the block 1505. At block 1505, the PE router advertises the mapping of VPN-ID to {VPN-LBI, VPN-LI} to the remote PE router through a VPN signalling protocol such as BGP. In some embodiments, generic enhancements to MPLS signalling protocols are implemented to advertise the {LBI, LI} for various MPLS contexts such as VPN.

At decision block 1510, the PE router determines whether there are more remote PE routers. If so, the method 1400 flows to block 1515 and the PE router identifies the next remote router. The method 1400 then flows to node 3, which connects to the decision block 1415 (see discussion regarding FIG. 14 above). If the PE router does not identify any additional remote PE routers, the method 1400 flows to block 1520 and the method 1400 ends.

The method 1400 flows from the node 2 to the block 1525. At block 1525, the method 1400 declares and handles the mismatched detected at block 1420 (see discussion regarding FIG. 14 above). The method 1400 flows to block 1525 and the method 1400 ends.

Figure 16:
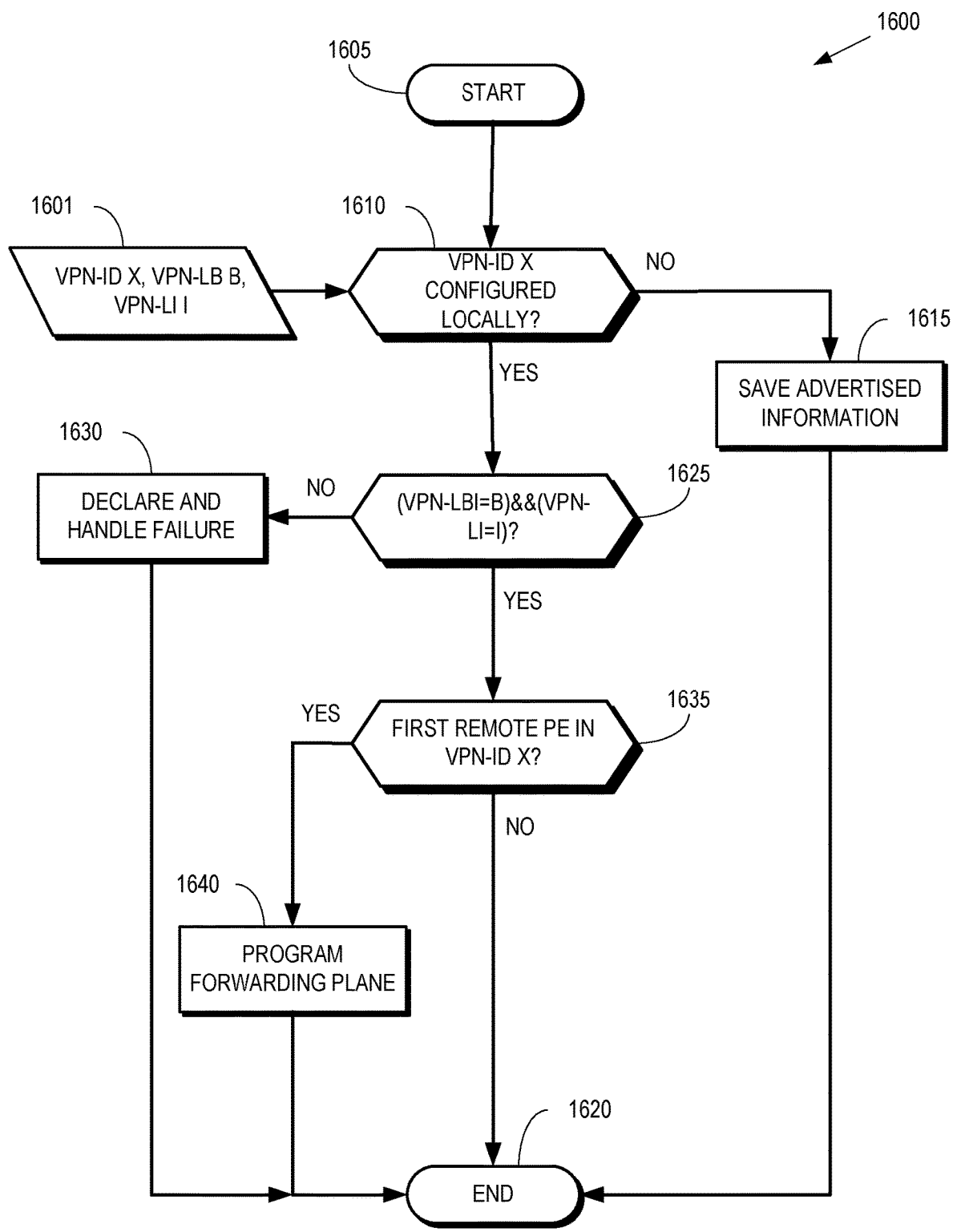
FIG. 16 is a flow diagram of a method of processing an advertisement of a VPN by a PE router according to some embodiments.

FIG. 16 is a flow diagram of a method 1600 of processing an advertisement of a VPN by a PE router according to some embodiments. The method 1600 is implemented in some embodiments of the PE routers 110-113 in the communication system 100 shown in FIG. 1. In the illustrated embodiment, the input 1601 to the method 1600 is an advertisement from a remote PE router of the mapping of a VPN-ID to {VPN-LBI, VPN-LI}.

The method 1600 begins at block 1605. At decision block 1610, the method 1600 uses the input 1601 to determine whether the VPN for the corresponding VPN-ID has been configured locally at the PE router. If not, the method 1600 flows to the block 1615 and the advertised information is saved at the PE router. The saved information would be used for activation of the VPN when the VPN would be configured locally at the PE router (See decision block 1415 in FIG. 14). The method 1600 then flows to block 1620 and the method 1600 ends. If the PE router determines that the VPN for the corresponding VPN-ID has been configured locally, the method 1600 flows to decision block 1625.

At decision block 1625, the PE router determines whether the tuple {VPN-LBI, VPN-LI} advertised by the remote PE router is same as the locally configured tuple. If not, the method 1600 flows to block 1630 and the method 1600 declares failure to process the advertisement and performs required handling. The method 1600 then ends at block 1620. If the advertised tuple is the same as the locally configured tuple, the method 1600 flows to decision block 1635.

At decision block 1635, the PE router determines whether this is the first advertisement of the VPN-ID from any remote PE router. If not, which indicates that the forwarding plane (FTN Table) has been already programmed for the VPN-ID while processing the first remote advertisement, the method 1600 flows to block 1620 and the method 1600 ends. If the PE router determines that this is the first advertisement of the VPN-ID from a remote PE router, the method 1600 flows to block 1640 and the PE router programs VPN-ID into the forwarding plane (FTN Table) with the OLS={LBI=VPN-LBI, OL=VPN-LI}. Once the forwarding plane is programmed, unicast/multicast packet in the VPN from this PE router to any remote PE router are pushed the programmed OLS. The method 1600 flows to block 1620 and the method 1600 ends.

Figure 17:
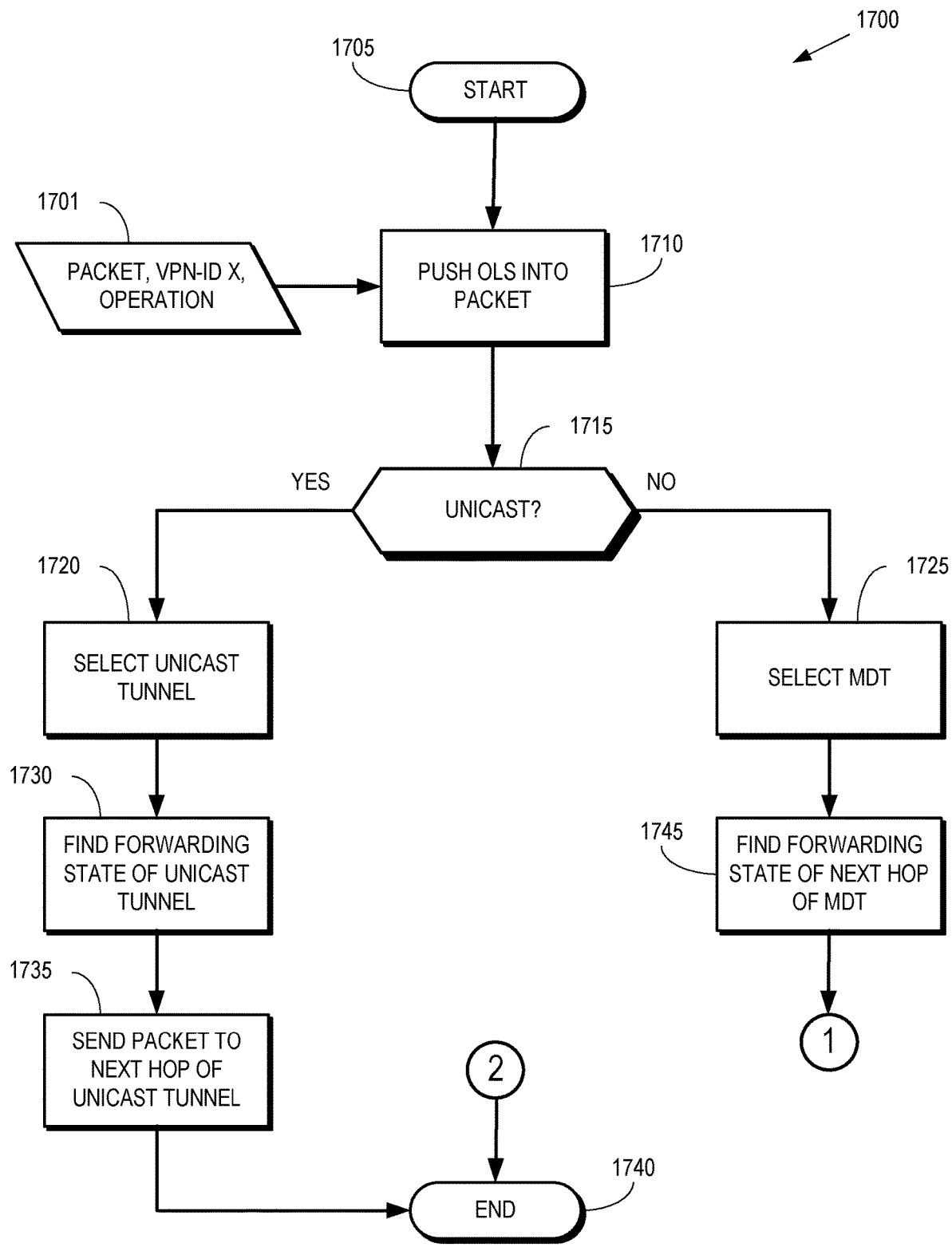
FIG. 17 is a flow diagram of a first portion of a method of unicasting a packet to a remote PE router or multicasting the packet to a set of remote PE routers from a PE router that is operating as an ingress router according to some embodiments.

FIG. 17 is a flow diagram of a first portion of a method 1700 of unicasting a packet to a remote PE router or multicasting the packet to a set of remote PE routers from a PE router that is operating as an ingress router according to some embodiments. The method 1700 is implemented in some embodiments of the PE routers 110-113 in the communication system 100 shown in FIG. 1. In the illustrated embodiment, the input 1701 to the method 1700 includes the packet to be sent in the context of a VPN, the context of the packet (indicated by the VPN-ID), and the operation to be performed by the PE router including unicasting the packet to a remote PE router or multicasting the packet to a set of remote PE routers.

The method 1700 begins at block 1705. At block 1710, the PE router looks up the entry in forwarding plane (FTN Table) for the VPN-ID. The OLS programmed in the entry is pushed onto the packet. If the LBI in the programmed OLS is 0 (or other default value) then LBI is not included in the OLS pushed onto the packet.

At decision block 1715, the PE router determines whether the operation for handling the packet is unicasting or multicasting. If the operation is unicast, the method 1700 flows to block 1720. If the operation is multicast, the method flows to block 1725.

At block 1720, the PE router selects the appropriate PSN tunnel to the remote PE router to tunnel the OLS encoded packet. In some embodiments, the PSN tunnel is chosen based on certain parameters of the packet (e.g QoS etc) or the VPN is statically configured to send packets on the tunnel. At block 1730, the PE router looks up the tunnel forwarding state (e.g., in the relevant FTN Table if the tunnel is MPLS LSP) and accesses the tunnel specific encapsulation, the immediate next-hop of the tunnel, and the like. The tunnel encapsulation is pushed on top of the OLS. At block 1735, the PE router sends the resultant packet to the immediate next-hop of the PSN tunnel. The method 1700 flows to block 1740 and the method 1700 ends.

At block 1725, the PE router selects the appropriate MDT to multicast the OLS encoded packet. In some embodiments, the MDT is chosen based on the set of egress PE routers (given as input) that are egress/leaf of the MDT. If there are multiple MDTs to the same set of egress PE routers, then the MDT is chosen based on QoS requirements of the packet or other characteristics. At block 1745, the PE router looks up the forwarding state of the MDT (e.g., relevant FTN Table if the MDT is MP LSP) to get the number of immediate next-hops, encapsulation for each next-hop, and other information. The method 1700 then flows to the node 1.

Figure 18:
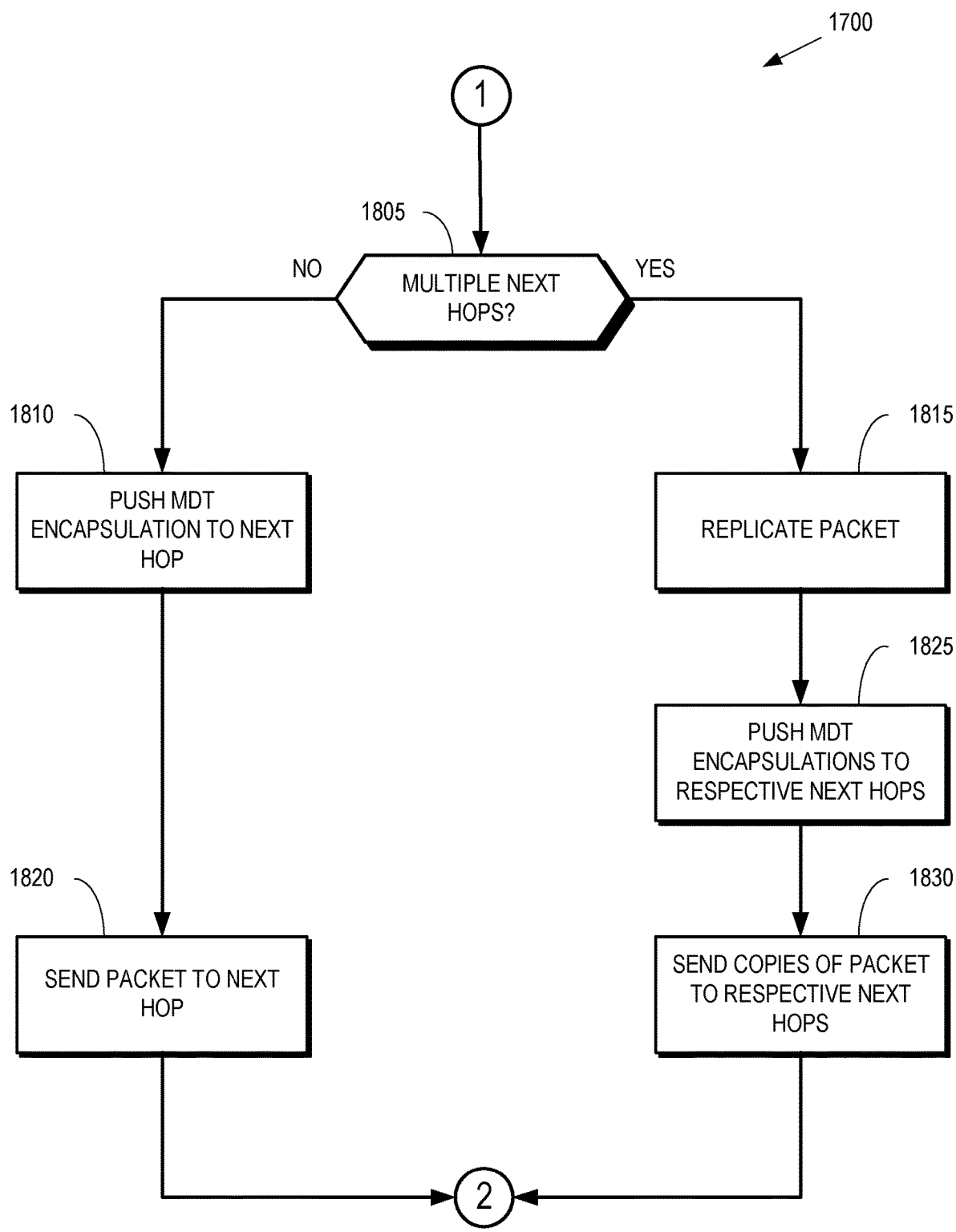
FIG. 18 is a flow diagram of a second portion of the method of unicasting the packet to a remote PE router or multicasting the packet to a set of remote PE routers from a PE router that is operating as an ingress router according to some embodiments.

FIG. 18 is a flow diagram of a second portion of the method 1700 of unicasting the packet to a remote PE router or multicasting the packet to a set of remote PE routers from a PE router that is operating as an ingress router according to some embodiments. The method 1700 flows from node 1 (see discussion of FIG. 17 above) to decision block 1805 and the PE router determines whether there are multiple next hops of the MDT. If there is only a single next hop, the method 1700 flows from block 1805 to the block 1810. If there are multiple next hops, the method 1700 flows from block 1805 to the block 1815.

At block 1810, the PE router pushes the MDT encapsulation for the next-hop on top of the OLS encoded packet. At block 1820, the PE router sends the resultant packet to the next-hop.

At block 1815, the PE router replicates the OLS encoded packet to generate copies for each next hop. At block 1825, the PE router pushes the MDT encapsulation for the respective next hops on top of the packet. At block 1830, the PE router sends the encapsulated copies of the packets to the respective next hops and the method 1700 flows to the node 2 and the method ends at block 1740 (see discussion of FIG. 17 above).

Figure 19:
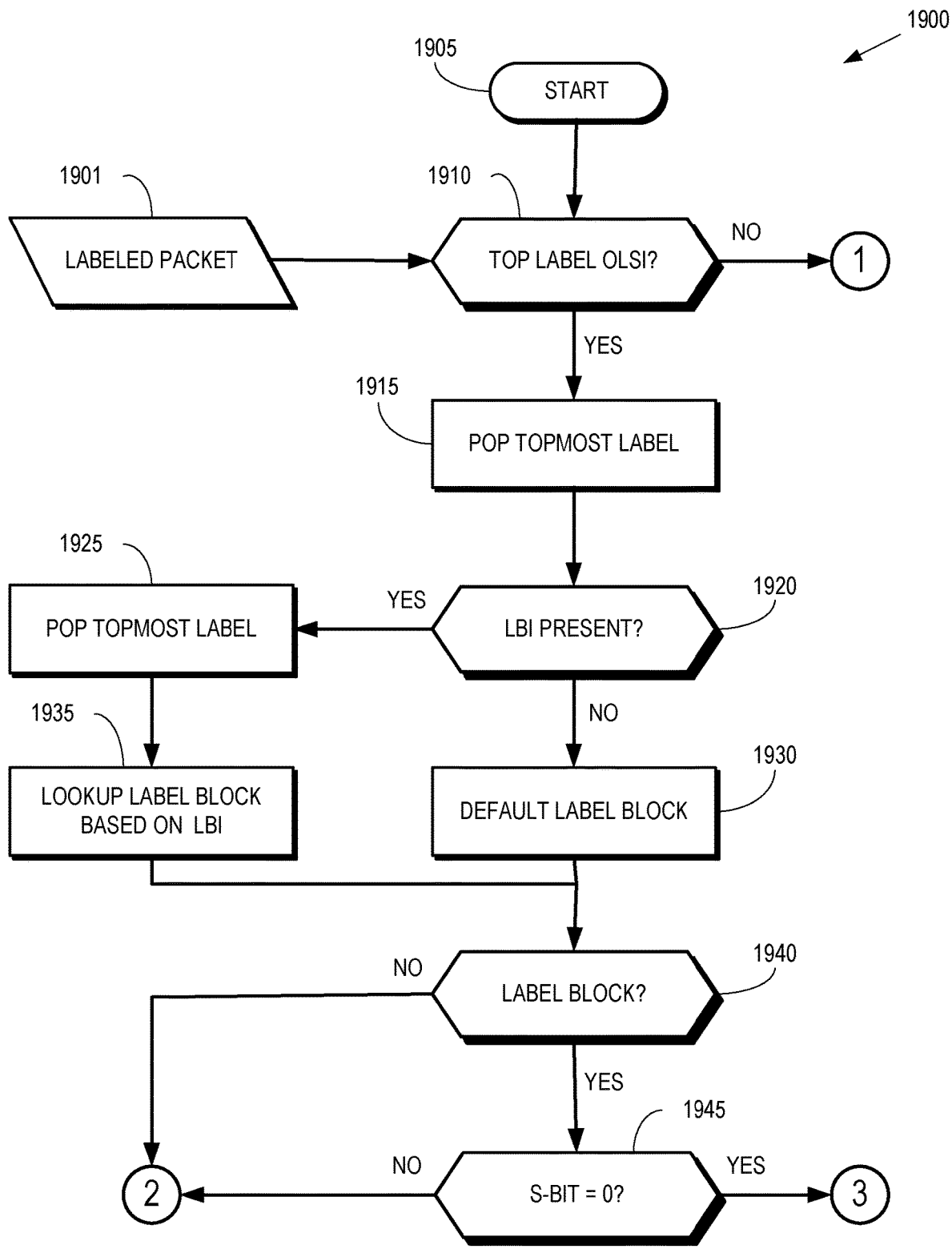
FIG. 19 is a flow diagram of a first portion of a method of processing a labels packet received on a unicast tunnel or an MDT terminated at a PE router that is operating as an egress router according to some embodiments.

FIG. 19 is a flow diagram of a first portion of a method 1900 of processing a labelled packet received on a unicast tunnel or an MDT terminated at a PE router that is operating as an egress router according to some embodiments. The method 1900 is implemented in some embodiments of the PE routers 110-113 in the communication system 100 shown in FIG. 1. In the illustrated embodiment, the input 1901 to the method 1900 includes a labelled packet after the removal of the encapsulation for a unicast tunnel or an MDT.

The method 1900 begins at the block 1905. At the block 1910, the PE router determines whether the topmost label of the packet is an OLSI. If not, which indicates that no OLS is present after the tunnel or MDT encapsulation and the received packet is a non-VPN packet, the method 1900 flows to node 1 (see discussion of FIG. 20 below). If the topmost label of the packet is an OLSI, the method 1900 flows to block 1915 and the PE router reads the required fields from the OLSI and pops the topmost label (e.g., the OLSI) from the packet.

At decision block 1920, the PE router determines whether an LBI is present in the packet. In some embodiments, the PE router checks whether a flags field in the OLSI indicates that the next label is an LBI. For example, a B-bit in the flags field is set to 1 to indicate that the next label is an LBI. If an LBI is present, the method 1900 flows to block 1925. If no LBI is present, which indicates that the next label is not LBI and the OLS is referring to LBI=0 (or other default value), the method 1900 flows to block 1930.

At block 1925, the PE router reads the LBI label from the packet and then pops the LBI label from the packet. At block 1935, the PE router looks up the label block for the LBI. The method 1900 then flows to decision block 1940.

At block 1930, the PE router looks up the label block that matches LBI=0 (or other default value). The method 1900 then flows to decision block 1940.

At decision block 1940, the PE router determines whether the label block is successfully identified based on the lookup. If the label block is not successfully identified by the lookup, the method 1900 flows to the node 2 (see discussion of FIG. 20 below). If the label block is successfully identified, the method 1900 flows to decision block 1945.

At decision block 1945, the PE router determines whether an S-bit in the LBI is equal to zero, which means that the LBI has the expected offset label. If the outcome check is false and the S-bit is not equal to zero, the method 1900 flows to node 2 (see discussion of FIG. 20 below). If the outcome check is true and the S-bit is equal to zero, the method 1900 flows to the node 3 (see discussion of FIG. 20 below).

Figure 20:
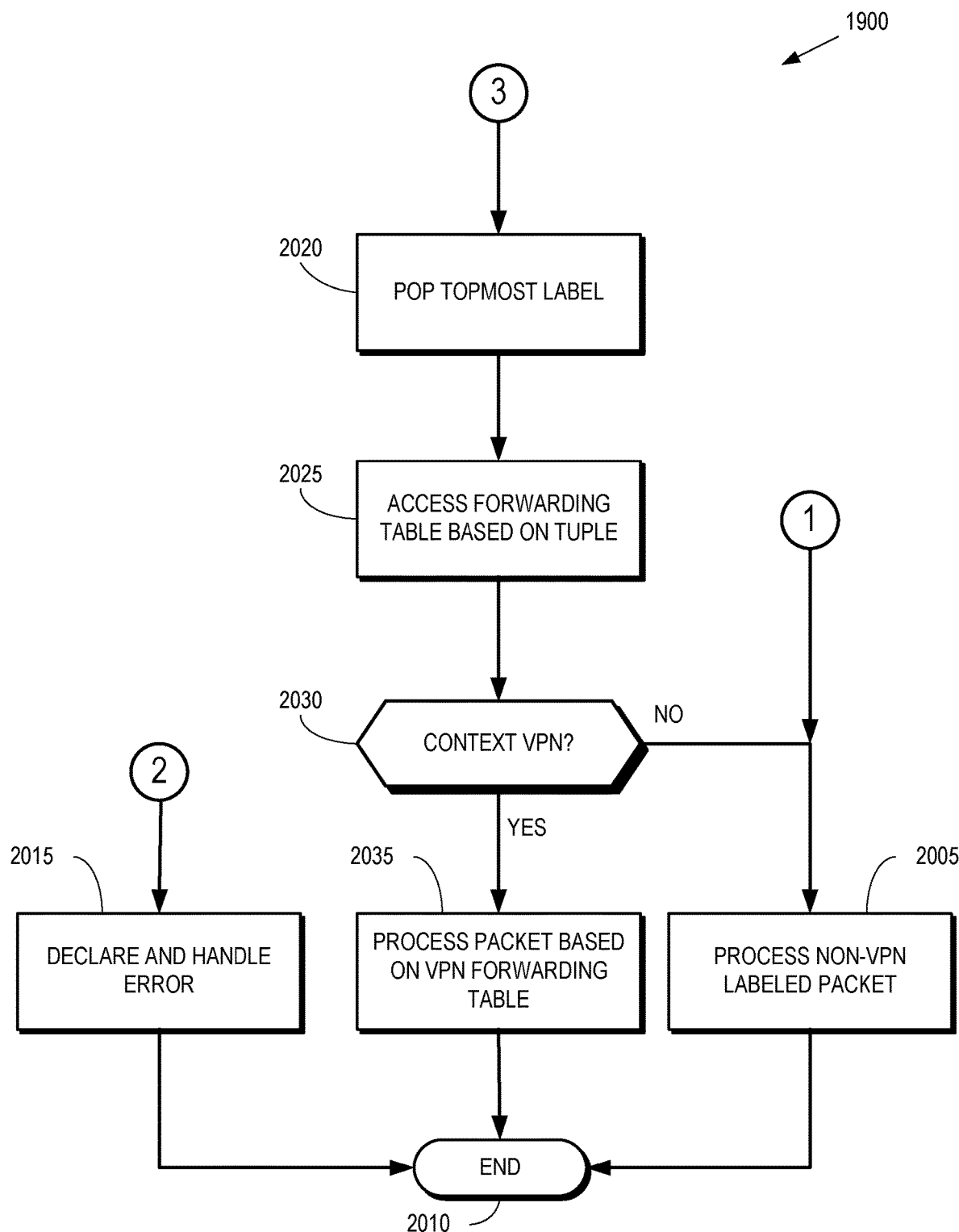
FIG. 20 is a flow diagram of a second portion of the method of processing a labels packet received on a unicast tunnel or an MDT terminated at a PE router that is operating as an egress router according to some embodiments.

FIG. 20 is a flow diagram of a second portion of the method 1900 of processing a labelled packet received on a unicast tunnel or an MDT terminated at a PE router that is operating as an egress router according to some embodiments.

The method 1900 flows from the node 1 to the block 2005. At block 2005, the PE router processes the packet as a non-VPN packet using conventional procedures. The method 1900 then flows to block 2010 and the method 1900 ends.

The method 1900 flows from the node 2 to the block 2015. At block 2015, the PE router declares an error in the processing of the packet and performs any required actions. The method 1900 then flows to block 2010 and the method 1900 ends.

The method 1900 flows from the node 3 to the block 2020. At block 2020, the PE router reads the offset label (OL) and pops the OL from the packet. At block 2025, the PE router accesses the forwarding table based on the tuple. In some embodiments, the PE router computes the actual label as (Start label of the Label Block+OL) and looks up the state of the label in its ILM Table, e.g., using (Label_Block-→Start_Label+OL value).

At decision block 2030, the PE router determines whether the context in the ILM entry for the label is a VPN. If the context is not a VPN, which indicates that the OL is used by another non-VPN application, the method 1900 flows to block 2005 and the packet is processed as a non-VPN labels packet. If the context is a VPN, the method 1900 flows to the block 2040 and the PE router processes the packet based on its VPN forwarding table, as discussed herein. The method 1900 then flows to block 2010 and the method 1900 ends.

Figure 21:
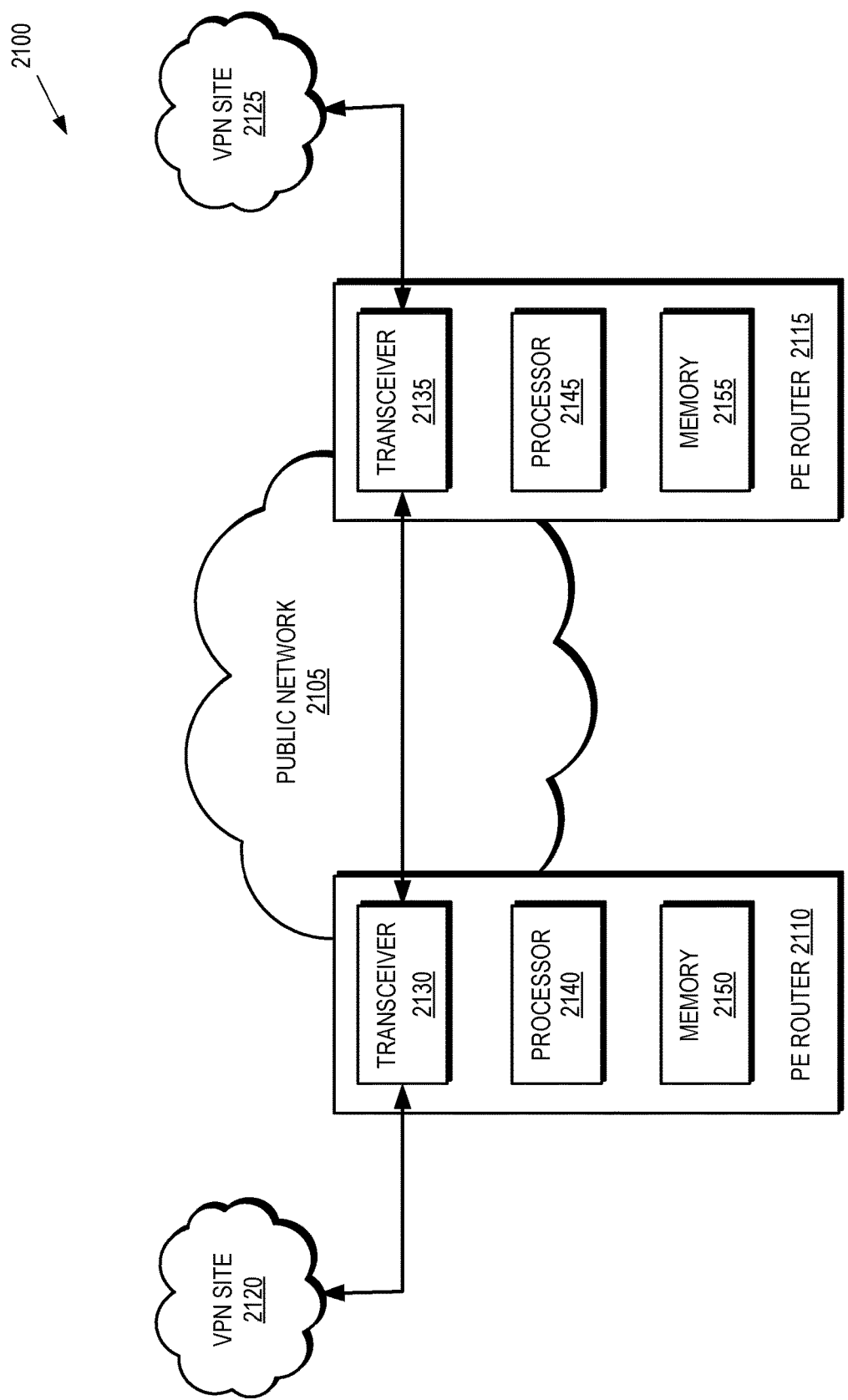
FIG. 21 is a block diagram of a communication system that supports VPN services over a public network according to some embodiments.

FIG. 21 is a block diagram of a communication system 2100 that supports VPN services over a public network 2105 according to some embodiments. The communication system 2100 includes PE routers 2110, 2115 that provide the VPN services to VPN sites 2120, 2125 via the public network 2105. Although a single VPN site 2120, 2125 is associated with each of the PE routers 2110, 2115 in FIG. 2, some embodiments of the PE routers 2110, 2115 are associated with multiple VPN sites for different VPNs, as discussed herein. The PE routers 2110, 2115 include respective transceivers 2130, 2135 for exchanging signals with respect to the VPN sites 2120, 2125 and the public network 2105. The signals include encapsulated packets associated with the VPNs supported by the VPN sites 2120, 2125, as discussed herein. The PE routers 2110, 2115 also include respective processors 2140, 2145 and memories 2150, 2155. The processors 2140, 2145 execute instructions stored in the corresponding memories 2150, 2155 and store information in the corresponding memories 2150, 2155 such as the results of the executed instructions. The processors 2140, 2145 and memories 2150, 2155 are configured to perform some embodiments of the techniques described herein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
   i. a combination of analog and/or digital hardware circuit(s) with software/firmware and
   ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A router, comprising:
    at least one processor; and
    at least one memory storing instructions that, when executed by the at least one processor, cause the router at least to:
        receive a tuple associated with a virtual private network within a network of the router, wherein the tuple includes a label block identifier configured to identify a block of labels and a label index configured to indicate a location of a label in the block of labels indicated by the label block identifier;
        identify, from a local label space of the router based on the label block identifier, a local block of labels assigned by the router for identification of virtual private networks in the network;
        assign, from the local block of labels based on the label index, a local label for identifying the virtual private network at the router; and
        support communication of a packet for the virtual private network, wherein the packet includes a packet payload and a packet header encoding the tuple.

2. The router of claim 1, wherein the packet header includes an offset label stack encoding the tuple.

3. The router of claim 2, wherein the offset label stack includes at least one label encoding the label block identifier and encoding the label index.

4. The router of claim 3, wherein the offset label stack includes an offset label stack indicator label configured to indicate that the packet header includes the at least one label encoding the label block identifier and encoding the label index.

5. The router of claim 2, wherein the offset label stack includes a first label encoding the label block identifier and a second label encoding the label index.

6. The router of claim 2, wherein the offset label stack includes a label having a first field encoding the label block identifier and a second field encoding the label index.

7. The router of claim 1, wherein the instructions, when executed by the at least one processor, cause the router at least to:
    program a forwarding table to map the local label for identifying the virtual private network at the router to at least one forwarding rule for packets received via the virtual private network.

8. The router of claim 1, wherein the instructions, when executed by the at least one processor, cause the router at least to:
    receive a second tuple associated with a second virtual private network within the network, wherein the second tuple includes the label block identifier and a second label index configured to indicate a location of a second label in the block of labels indicated by the label block identifier;
    identify, from the local label space of the router based on the label block identifier, the local block of labels assigned by the router for identification of virtual private networks in the network; and
    assign, from the local block of labels based on the second label index, a second local label for identifying the second virtual private network at the router.

9. The router of claim 8, wherein the instructions, when executed by the at least one processor, cause the router at least to:
    program the forwarding table to map the second local label for identifying the second virtual private network at the router to at least one second forwarding rule for packets received via the second virtual private network.

10. The router of claim 1, wherein, to support communication of the packet for the virtual private network, the instructions, when executed by the at least one processor, cause the router at least to:
    receive the packet;
    identify, based on the tuple from the packet header, the local label for identifying the virtual private network at the router; and
    determine, based on the local label for identifying the virtual private network at the router, at least one forwarding rule for the packet.

11. The router of claim 1, wherein, to support communication of the packet for the virtual private network, the instructions, when executed by the at least one processor, cause the router at least to:
    send the packet toward at least one other router.

12. A method comprising:
    receiving, by a router of a network, a tuple associated with a virtual private network within the network, wherein the tuple includes a label block identifier configured to identify a block of labels and a label index configured to indicate a location of a label in the block of labels indicated by the label block identifier;
    identifying, by the router from a local label space of the router based on the label block identifier, a local block of labels assigned by the router for identification of virtual private networks in the network;
    assigning, by the router from the local block of labels based on the label index, a local label for identifying the virtual private network at the router; and
    supporting, by the router, communication of a packet for the virtual private network, wherein the packet includes a packet payload and a packet header encoding the tuple.

13. The method of claim 12, wherein packet header includes an offset label stack encoding the tuple.

14. The method of claim 13, wherein the offset label stack includes at least one label encoding the label block identifier and encoding the label index.

15. The method of claim 14, wherein the offset label stack includes an offset label stack indicator label configured to indicate that the packet header includes the at least one label encoding the label block identifier and encoding the label index.

16. The method of claim 13, wherein the offset label stack includes a first label encoding the label block identifier and a second label encoding the label index.

17. The method of claim 13, wherein the offset label stack includes a label having a first field encoding the label block identifier and a second field encoding the label index.

18. The method of claim 12, further comprising:
programming a forwarding table to map the local label for identifying the virtual private network at the router to at least one forwarding rule for packets received via the virtual private network.

19. The method of claim 12, further comprising:
receiving, by the router, a second tuple associated with a second virtual private network within the network, wherein the second tuple includes the label block identifier and a second label index configured to indicate a location of a second label in the block of labels indicated by the label block identifier;
identifying, by the router from the local label space of the router based on the label block identifier, the local block of labels assigned by the router for identification of virtual private networks in the network; and
assigning, by the router from the local block of labels based on the second label index, a second local label for identifying the second virtual private network at the router.

20. The method of claim 19, further comprising:
programming the forwarding table to map the second local label for identifying the second virtual private network at the router to at least one second forwarding rule for packets received via the second virtual private network.

21. The method of claim 20, wherein supporting communication of the packet for the virtual private network comprises:
receiving the packet;
identifying, based on the tuple from the packet header, the local label for identifying the virtual private network at the router; and
determining, based on the local label for identifying the virtual private network at the router, at least one forwarding rule for the packet.

22. The method of claim 21, wherein supporting communication of the packet for the virtual private network comprises:
sending the packet toward at least one other router.

23. A router, comprising:
at least one processor; and
at least one memory storing instructions that, when executed by the at least one processor, cause the router at least to:
maintain an association of a local label, from a local block of labels of the router, to a virtual private network supported by a network of the router, wherein the local label identifies the virtual private network at the router;
receive a packet including a packet payload and a packet header, wherein the packet header encodes a tuple including a label block identifier configured to identify a block of labels and a label index configured to indicate a location of a label in the block of labels indicated by the label block identifier;
determine, from the local block of labels based on the label block identifier and the label index, the local label identifying the virtual private network at the router; and
determine, based on the local label identifying the virtual private network at the router, forwarding of the packet payload at the router.

\* \* \* \* \*